(12) United States Patent
Ohishi

(10) Patent No.: US 11,223,266 B2
(45) Date of Patent: Jan. 11, 2022

(54) POWER GENERATION DEVICE AND INPUT DEVICE

(71) Applicant: Panasonic Intellectual Property Management Co., Ltd., Osaka (JP)

(72) Inventor: Suguru Ohishi, Okayama (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 169 days.

(21) Appl. No.: 16/640,569

(22) PCT Filed: Sep. 20, 2018

(86) PCT No.: PCT/JP2018/034720
§ 371 (c)(1),
(2) Date: Feb. 20, 2020

(87) PCT Pub. No.: WO2019/073767
PCT Pub. Date: Apr. 18, 2019

(65) Prior Publication Data
US 2020/0195117 A1    Jun. 18, 2020

(30) Foreign Application Priority Data
Oct. 10, 2017   (JP) .............................. JP2017-197162

(51) Int. Cl.
*H02K 35/02*  (2006.01)
*H01F 7/02*   (2006.01)
(Continued)

(52) U.S. Cl.
CPC ............... *H02K 35/02* (2013.01); *H01F 7/02* (2013.01); *H02K 7/1853* (2013.01); *H02K 35/04* (2013.01); *H02N 2/18* (2013.01)

(58) Field of Classification Search
CPC ...... H02K 35/02; H02K 35/04; H02K 7/1853; H02K 35/06; E05C 3/00; F03G 5/06; F03G 2730/05
See application file for complete search history.

(56) References Cited

U.S. PATENT DOCUMENTS

| 9,324,523 B2 * | 4/2016 | Matsumoto .......... H02K 7/1853 |
| 10,277,104 B2 * | 4/2019 | Takahashi .............. H02K 35/02 |
| 2015/0279598 A1 | 10/2015 | Matsumoto et al. |

FOREIGN PATENT DOCUMENTS

WO     2014/061225 A1    4/2014

OTHER PUBLICATIONS

International Search Report issued in corresponding International Patent Application No. PCT/JP2018/034720, dated Dec. 11, 2018, with English translation.

* cited by examiner

*Primary Examiner* — Tran N Nguyen
*Assistant Examiner* — Leda T Pham
(74) *Attorney, Agent, or Firm* — McDermott Will & Emery LLP

(57) ABSTRACT

Magnets are configured to generate absorption force for holding a movable member at each of first and second positions. A power generator includes a mover configured to move in conjunction with the movable member. The power generator is configured to convert kinetic energy of the mover into electrical energy. When an operator moves in a direction in which a first pressing part approaches a second holding part while the movable member is at the first position, a spring member is compressed by the first pressing part and the second holding part. The spring member then generates restoring force for moving the movable member to the second position. When the operator moves in a direction in which a second pressing part approaches a first holding
(Continued)

part while the movable member is at the second position, the spring member is compressed by the second pressing part and the first holding part. The spring member then generates restoring force for moving the movable member to the first position.

6 Claims, 10 Drawing Sheets

(51) Int. Cl.
  *H02K 7/18* (2006.01)
  *H02K 35/04* (2006.01)
  *H02N 2/18* (2006.01)

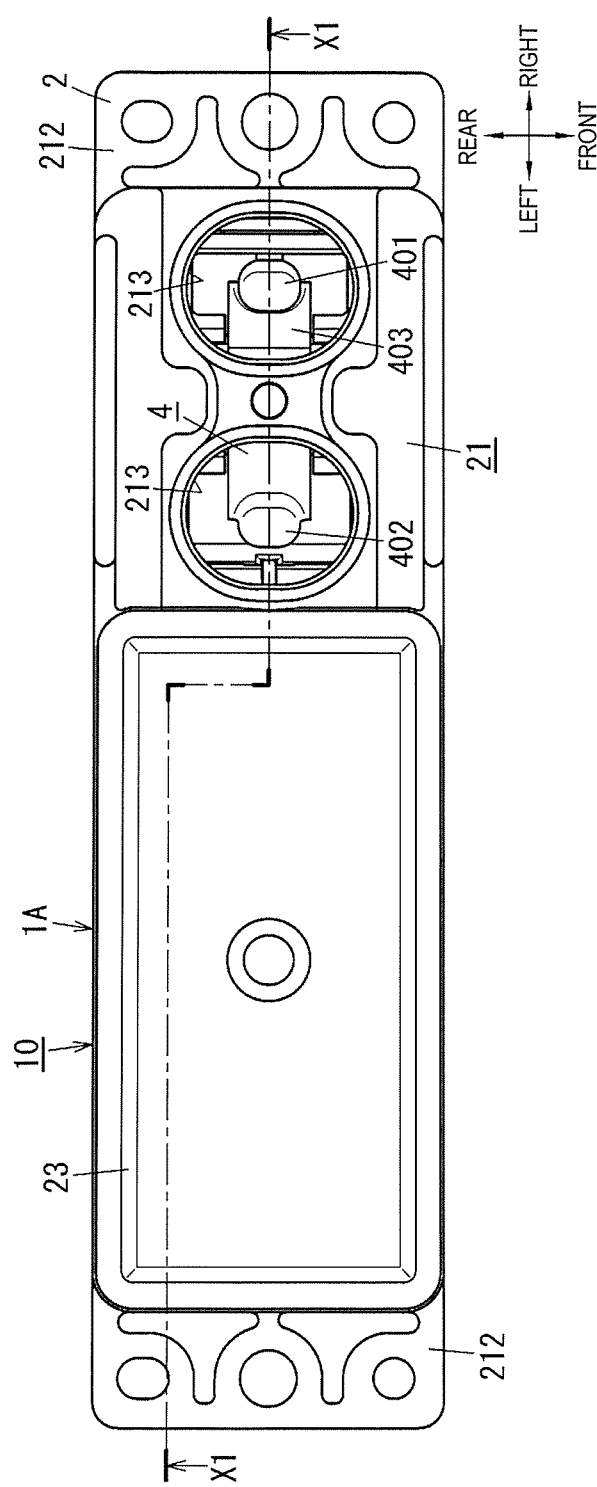
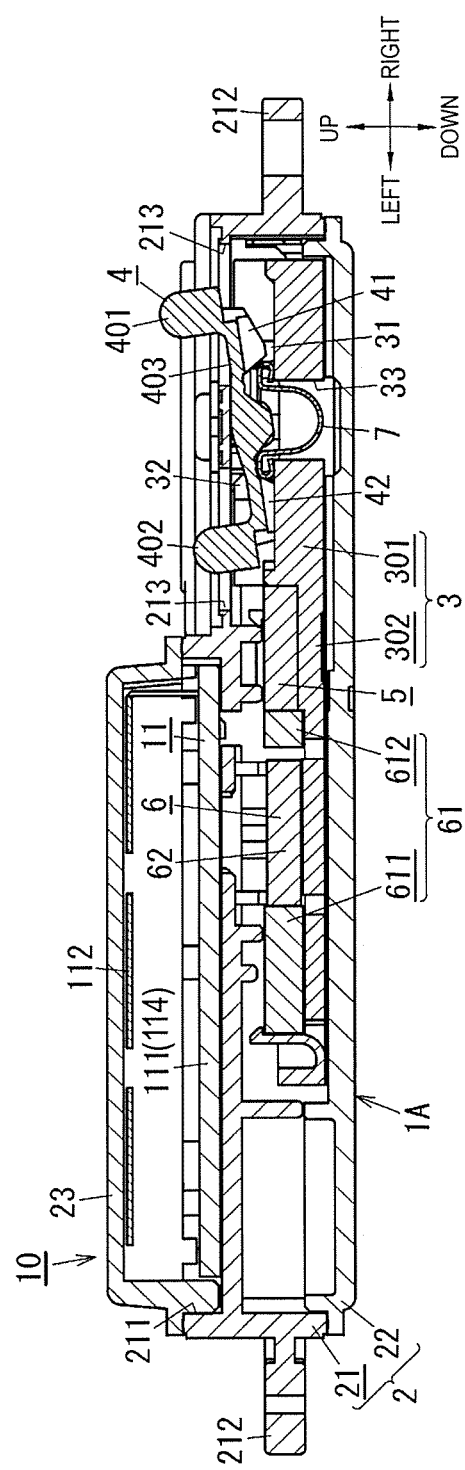
FIG. 1A
FIG. 1B

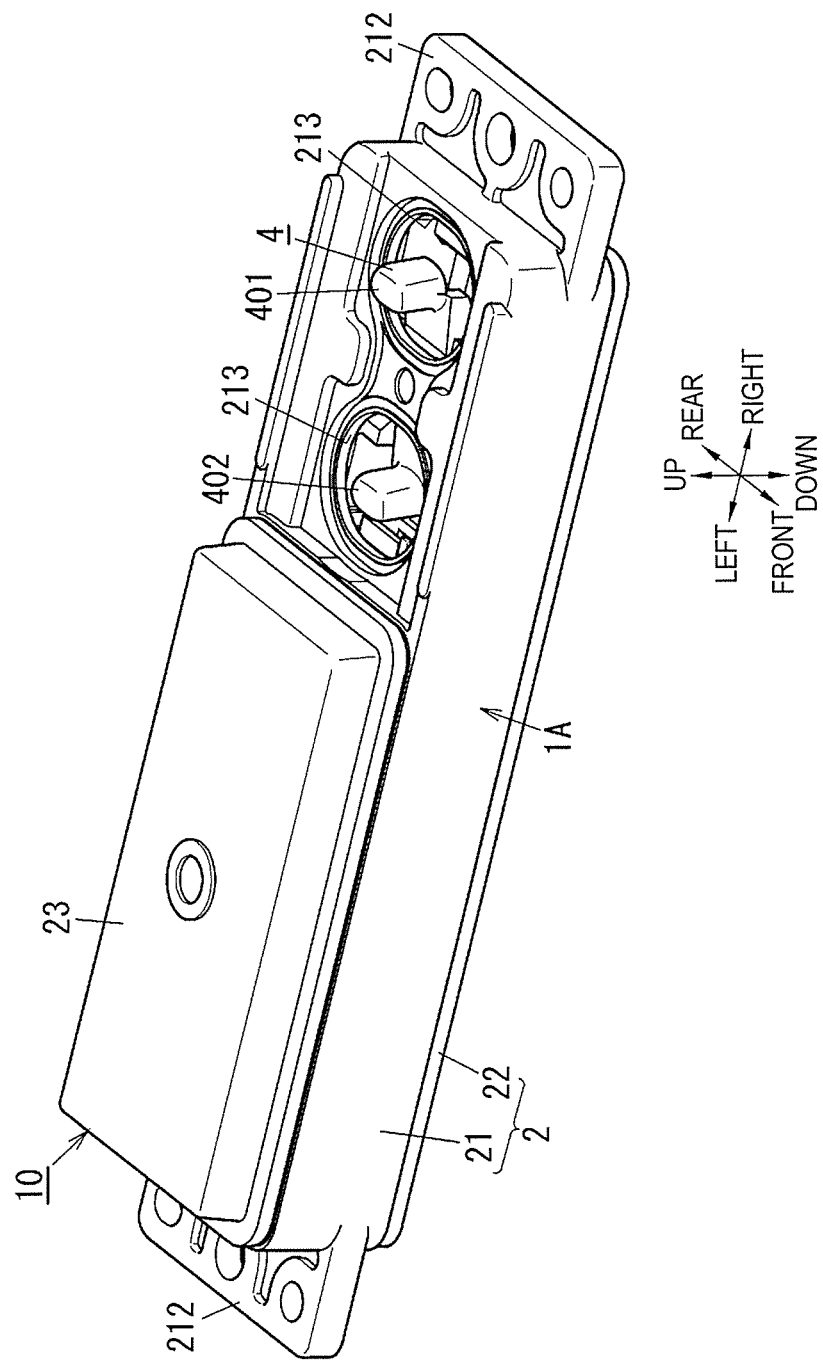

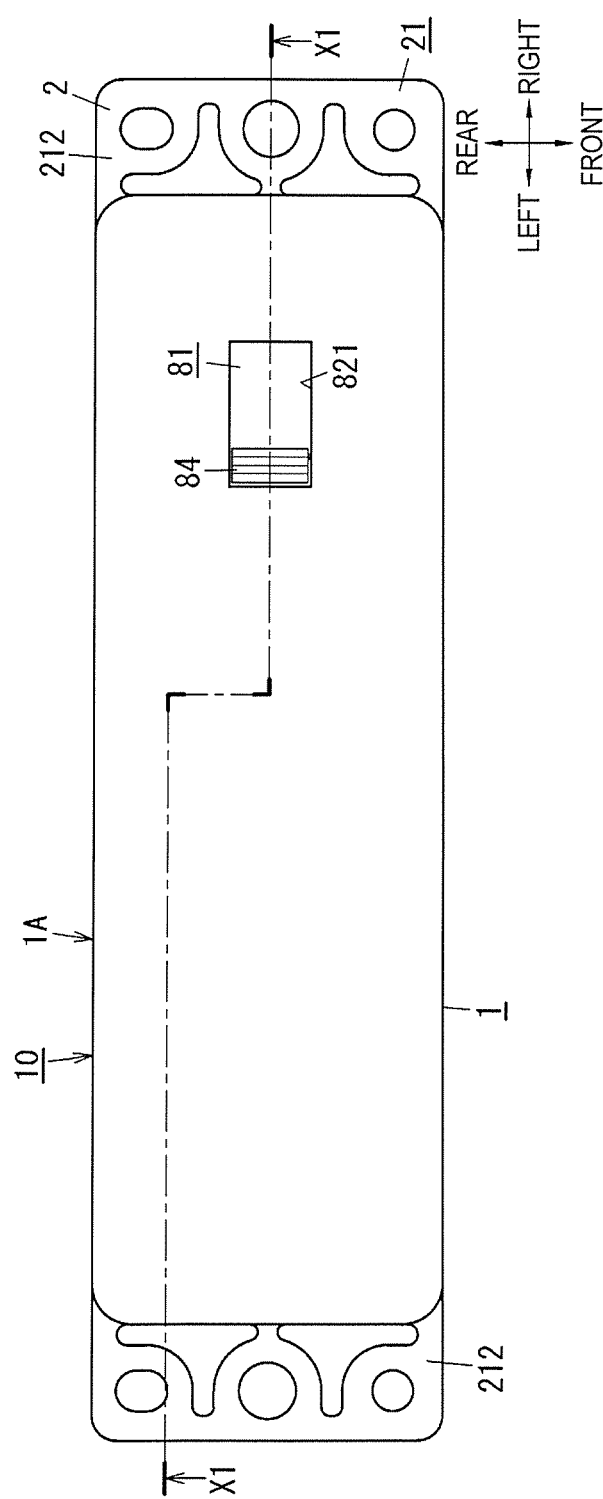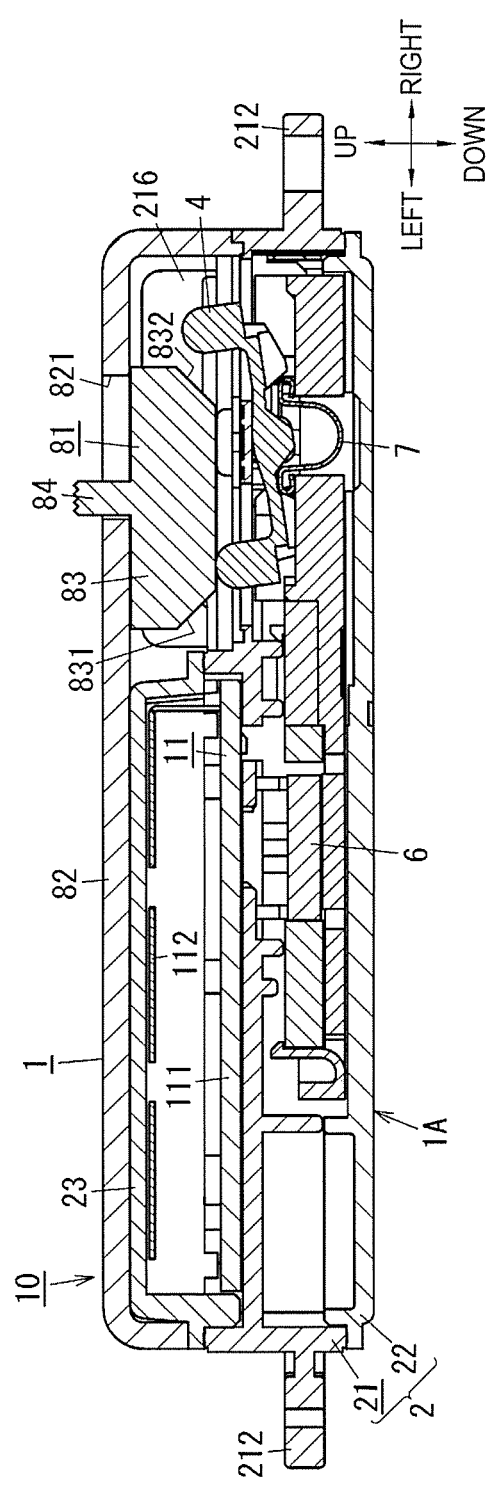

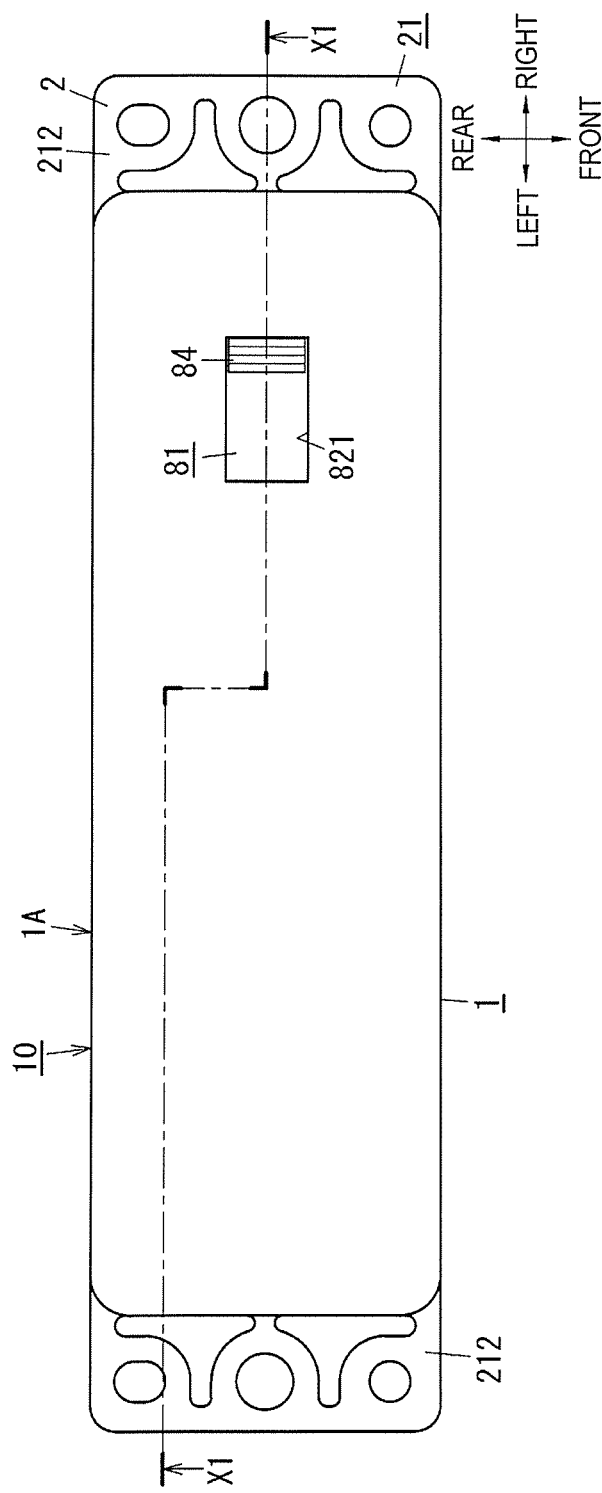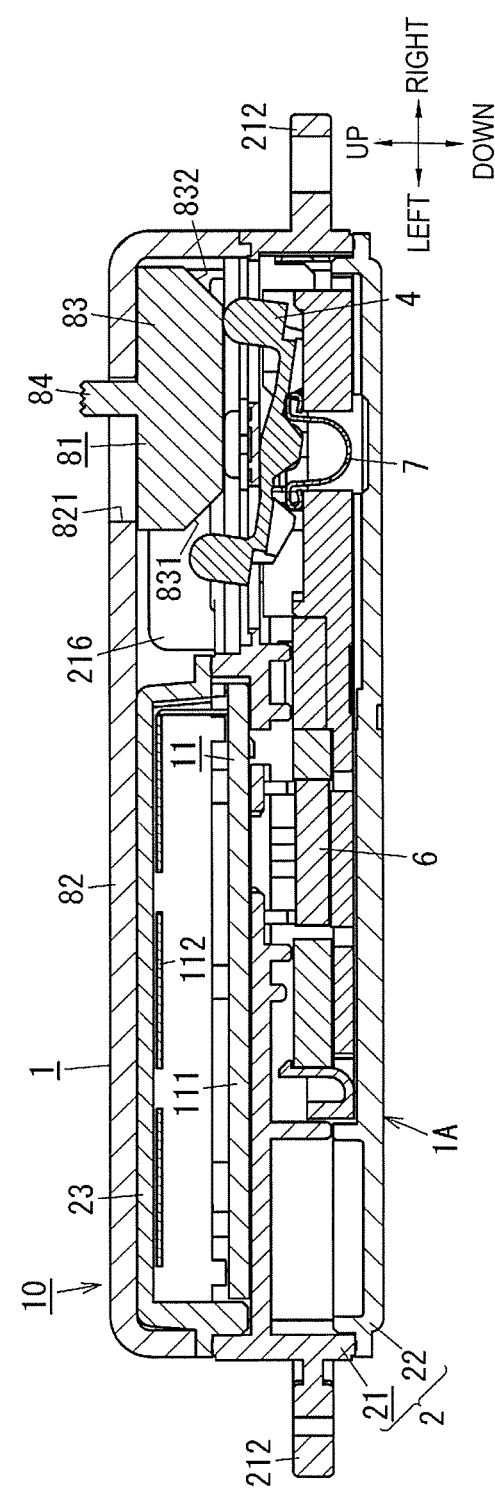
FIG. 10A
FIG. 10B

POWER GENERATION DEVICE AND INPUT DEVICE

CROSS-REFERENCE OF RELATED APPLICATIONS

This application is a U.S. national stage application of U.S.C. § 371 of International Patent Application No. PCT/JP2018/034720 filed on Sep. 20, 2018, which claims the benefit of Japanese Patent Application No. 2017-197162 filed on Oct. 10, 2017, the contents all of which are incorporated herein by reference.

TECHNICAL FIELD

The present disclosure generally relates to power generation devices and input devices. More specifically, the present disclosure relates to a power generation device and an input device, in which kinetic energy generated by a mover along with movement of an operator is converted into electrical energy to generate electric power.

BACKGROUND ART

Such power generation devices have been known that each includes a movable member that utilizes restoring force of a spring member to move (e.g., see PTL 1).

A power generation device described in PTL 1 includes an operator (push button), a movable member (slider), two spring members (a first spring and a second spring), two permanent magnets (a first permanent magnet and a second permanent magnet), and a power generator. While the operator is not operated, the movable member is kept stopped stably by absorption force of one of the permanent magnets. When the operator is operated from this state, restoring force of one of the spring members (the first spring) cancels absorption by one of the permanent magnets to allow the movable member to move rightward. When the operator being operated is released, restoring force of another one of the spring members (the second spring) cancels absorption by another one of the permanent magnets to allow the movable member to move leftward.

When the movable member moves in the power generation device described in PTL 1, a direction of magnetic flux passing through a core (a first yoke member) of the power generator changes, causing a coil installed on an outer circumference of the core to generate electromotive force.

CITATION LIST

Patent Literature

PTL 1: WO 2014/061225

SUMMARY OF THE INVENTION

A power generation device according to an aspect of the present disclosure includes a fixing member, a movable member held by the fixing member, the movable member being movable, relative to the fixing member, in a first direction between a first position and a second position, an operator configured to move between a first operation position and a second operation position, the operator lying at the first operation position while the movable member is at the first position, the operator lying at the second operation position while the movable member is at the second position, magnets configured to generate absorption force for holding the movable member at each of the first position and the second position, a power generator including a mover configured to move in conjunction with the movable member, the power generator being configured to convert kinetic energy of the mover into electrical energy, a spring member held by the movable member, the spring member being configured to transmit force from the operator to the movable member, and a slide member held by the fixing member. The movable member includes a first holding part and a second holding part away from each other in the first direction. The movable member holds the spring member between the first holding part and the second holding part. The operator includes a first pressing part and a second pressing part. While the operator is at the first operation position, the first pressing part and the second holding part pinch the spring member. While the operator is at the second operation position, the second pressing part and the first holding part pinch the spring member. When the operator moves in a direction in which the first pressing part approaches the second holding part while the movable member is at the first position, the first pressing part and the second holding part compress the spring member to allow the spring member to generate restoring force for moving the movable member from the first position to the second position. When the operator moves in a direction in which the second pressing part approaches the first holding part while the movable member is at the second position, the second pressing part and the first holding part compress the spring member to allow the spring member to generate restoring force for moving the movable member from the second position to the first position. The slide member is movable in the first direction between a first slide position and a second slide position. The slide member lies at the first slide position while the operator is at the first operation position. The slide member lies at the second slide position while the operator is at the second operation position. When the slide member moves between the first slide position and the second slide position, the slide member presses the operator. The operator is configured to move in conjunction with the slide member.

An input device according to an aspect of the present disclosure includes the power generation device described above, and a signal processing circuit electrically coupled to the power generator. The signal processing circuit is configured to use the electrical energy generated by the power generator moving in conjunction with the operator to output a signal.

An advantage of the present disclosure is to achieve a simplified and small-sized structure.

BRIEF DESCRIPTION OF DRAWINGS

FIG. 1A is a plan view illustrating a state where a movable member is at a first position in an input device including a power generation device according to an exemplary embodiment of the present disclosure.

FIG. 1B is a cross-sectional view taken along line X1-X1 in FIG. 1A.

FIG. 3 is a perspective view of the input device.

FIG. 9A is a plan view illustrating a state where a slide member is at a first slide position in the input device.

FIG. 9B is a cross-sectional view taken along line X1-X1 in FIG. 9A.

FIG. 10A is a plan view illustrating a state where the slide member is at a second slide position in the input device.

FIG. 10B is a cross-sectional view taken along line X1-X1 in FIG. 10A.

DESCRIPTION OF EMBODIMENT

Figure 2A:
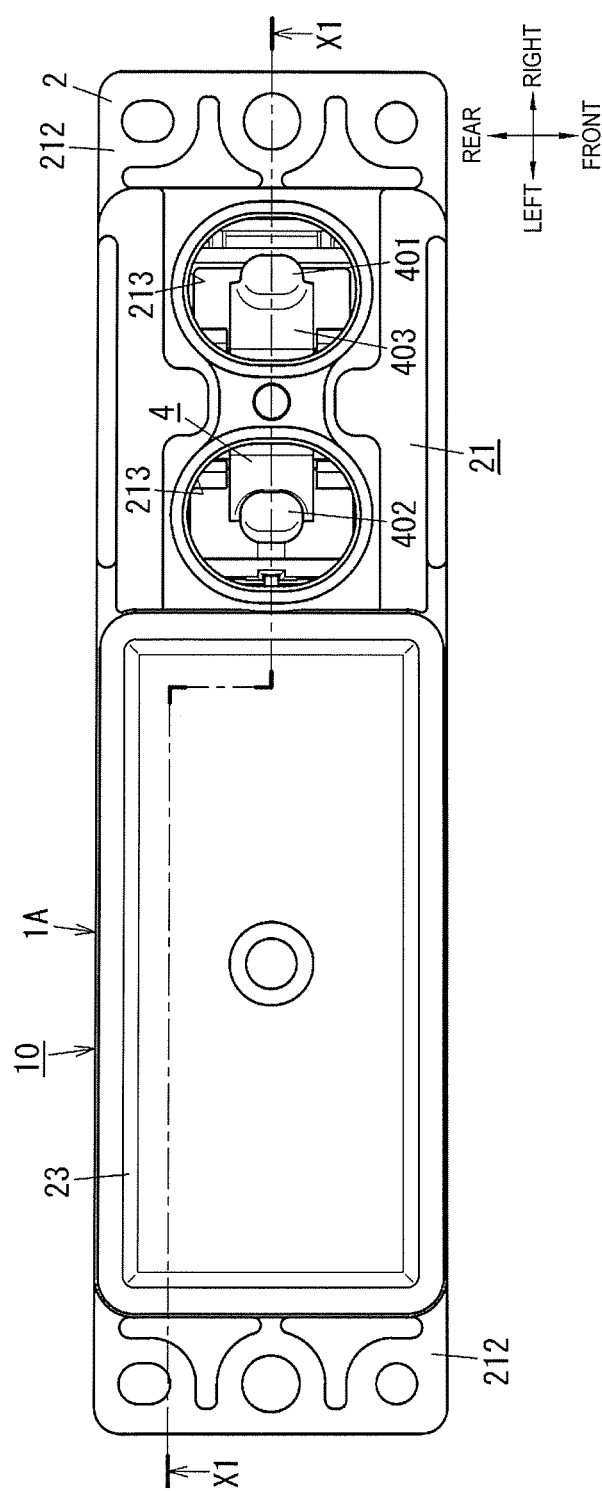
FIG. 2A is a plan view illustrating a state where the movable member is at a second position in the input device.

Before describing an exemplary embodiment, what is demand in markets on development of power generation devices will now be described herein. Due to an increase of power generation facilities that use fossil fuel mainly based on petroleum as a raw material in recent years, future depletion of such fossil fuel is a big issue. Development of autonomous power generation devices that do not use fossil fuel is accordingly demanded. It has been known that autonomous power generation devices employ power generation methods such as hydraulic power generation, solar power generation, wind power generation, and geothermal power generation. These power generation devices often require large facilities.

On the other hand, a switch type power generation device that converts kinetic energy generated by a mover along with operation (movement) of an operator into electrical energy to generate power does not require a large facility, achieving small-sizing, compared with power generation methods such as hydraulic power generation, solar power generation, wind power generation, and geothermal power generation. The switch type power generation device therefore offers a possibility of installation on a comparatively smaller electronic device, for example. In such a power generation device, however, an amount of power generation may possibly change depending on a movement speed of a movable member. In such a power generation device, a quick moving mechanism may thus be adopted. The quick moving mechanism utilizes restoring force of a spring member to move the movable member comparatively quickly regardless of a movement speed of an operator. In the power generation device adopted with the quick moving mechanism, energy accumulated in the spring member when the spring member is deformed along with operation (movement) of the operator causes the movable member to move, allowing the movable member to move comparatively quickly to achieve a stable amount of power generation.

A conventional power generation device, as described above, will be described herein. In the conventional power generation device, as described above, separate spring members (a first spring and a second spring) are respectively required for movement of the movable member in one direction (rightward) and movement of the movable member in another direction (leftward). Therefore, an increase in number of spring members may possibly prevent the power generation device from being simplified and small-sized in structure.

The exemplary embodiment described below illustrates a switch type power generation device in which its structure can be simplified and small-sized even though a quick moving mechanism is adopted.

Exemplary Embodiment (1) Outline

Power generation device 1 according to the present exemplary embodiment includes, as illustrated in FIGS. 9A and 9B, device main body 1A and slide member 81. Slide member 81 will be described later. Outline of device main body 1A will first be described.

Device main body 1A includes, as illustrated in FIGS. 1A and 1B, fixing member 2, movable member 3, operator 4, permanent magnets 5, power generator 6, and spring member 7.

Movable member 3 is configured to be movable in a first direction (left-right directions in an example in FIG. 1A), relative to fixing member 2. Movable member 3 moves between a first position (a position illustrated in FIG. 1B) and a second position (a position illustrated in FIG. 2B). In here, movable member 3 being at the first position lies closer to a right side of fixing member 2 than movable member 3 being at the second position does. Operator 4 is configured to be movable, relative to fixing member 2. Operator 4 moves between a first operation position and a second operation position. Operator 4 lies at the first operation position while movable member 3 is at the first position. Operator 4 lies at the second operation position while movable member 3 is at the second position. However, operator 4 moves separately from movable member 3. That is, movable member 3 and operator 4 are both movable relative to fixing member 2. Movable member 3 and operator 4 are independent, separate members from each other, and are movable separately.

Permanent magnets 5 are configured to generate absorption force for holding movable member 3 at each of the first position and the second position. Power generator 6 includes mover 61 configured to move in conjunction with movable member 3. Power generator 6 is configured to convert kinetic energy of mover 61 into electrical energy. Spring member 7 is held by movable member 3. Spring member 7 is configured to transmit force from operator 4 to movable member 3.

Figure 5A:
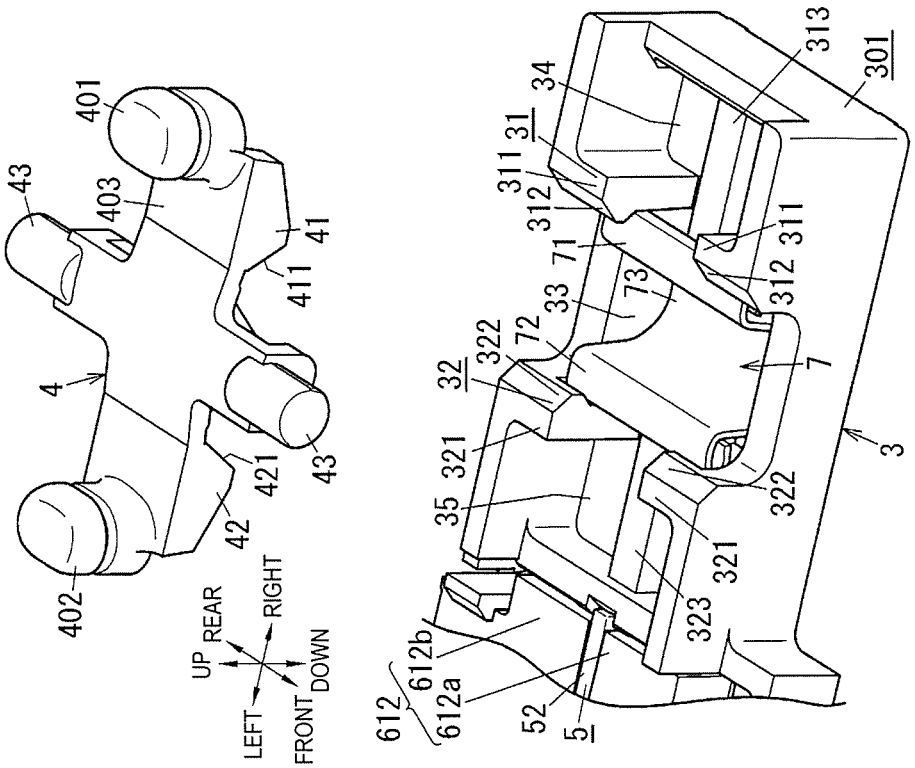
FIG. 5A is an exploded perspective view of main parts, illustrating a state where an operator and a spring member are removed from the movable member in the power generation device.

Movable member 3 includes first holding part 31 and second holding part 32 (see FIG. 5A). First holding part 31 and second holding part 32 are away from each other in the first direction (in here, the left-right directions). In here, first holding part 31 lies closer to the right side than second holding part 32 does. First holding part 31 and second holding part 32 pinch spring member 7. Movable member 3 holds spring member 7.

Operator 4 includes first pressing part 41 and second pressing part 42. First pressing part 41 and second pressing part 42 are away from each other in the first direction (in here, the left-right directions). In here, first pressing part 41 lies closer to the right side than second pressing part 42 does.

While movable member 3 is at the first position (the state illustrated in FIG. 1A), first pressing part 41 and second holding part 32 pinch spring member 7. While movable member 3 is at the second position (the state illustrated in FIG. 2A), second pressing part 42 and first holding part 31 pinch spring member 7. When operator 4 moves in a direction in which first pressing part 41 approaches second holding part 32 while movable member 3 is at the first position, spring member 7 is compressed by first pressing part 41 and second holding part 32. Spring member 7 then generates restoring force for moving movable member 3 to the second position. When operator 4 moves in a direction in which second pressing part 42 approaches first holding part 31 while movable member 3 is at the second position, spring member 7 is compressed by second pressing part 42 and first holding part 31. Spring member 7 then generates restoring force for moving movable member 3 to the first position.

In the present disclosure, "predetermined directions" correspond to directions in which movable member 3 moves. In the present exemplary embodiment, as an example, movable member 3 moves in a straight line between the first position and the second position. Directions on a straight line joining the first position and the second position therefore correspond to the "predetermined directions".

In the present disclosure, one of the "predetermined directions" may sometimes be referred to as the "first direction". Operation of device main body 1A having the configuration described above will be simply described. While movable member 3 is at the first position, movable member 3 is held at the first position by absorption force of one of permanent magnets 5. In this state, when operator 4 is operated, and thus operator 4 moves, for example, displacement occurs in the direction in which first pressing part 41 approaches second holding part 32. Spring member 7 pinched between first pressing part 41 and second holding part 32 is accordingly compressed. At this time, spring member 7 deforms. Energy is accumulated in spring member 7. Spring member 7 thus generates restoring force. When the displacement of first pressing part 41 gradually increases in amount, and the restoring force of spring member 7 overcomes the absorption force of the one of permanent magnets 5, movable member 3 held by the one of permanent magnets 5 is released. The restoring force of spring member 7 thus causes movable member 3 to move from the first position to the second position.

On the other hand, while movable member 3 is at the second position, movable member 3 is held at the second position by absorption force of another one of permanent magnets 5. In this state, when operator 4 is operated, and thus operator 4 moves, for example, displacement occurs in the direction in which second pressing part 42 approaches first holding part 31. Spring member 7 pinched between second pressing part 42 and first holding part 31 is accordingly compressed. At this time, spring member 7 deforms. Energy is accumulated in spring member 7. Spring member 7 thus generates restoring force. When the displacement of second pressing part 42 gradually increases in amount, and the restoring force of spring member 7 overcomes the absorption force of the other one of permanent magnets 5, movable member 3 held by the other one of permanent magnets 5 is released. The restoring force of spring member 7 then causes movable member 3 to move from the second position to the first position.

In device main body 1A according to the present exemplary embodiment, movable member 3 therefore moves between the first position and the second position along with operation (movement) of operator 4, allowing power generator 6 to convert, into electrical energy, kinetic energy of mover 61 moving in conjunction with movable member 3. Due to a quick moving mechanism adopted to device main body 1A, restoring force of spring member 7 is utilized to allow movable member 3 to move. Movable member 3 thus comparatively quickly moves regardless of a movement speed of operator 4. In device main body 1A, a movement speed of movable member 3 therefore becomes stable, achieving a comparatively stable amount of power generation.

Device main body 1A according to the present exemplary embodiment can be adopted to input device 10, as illustrated in FIGS. 1A and 1B. That is, input device 10 according to the present exemplary embodiment includes device main body 1A and signal processing circuit 11. Signal processing circuit 11 is electrically coupled to power generator 6 of device main body 1A. Signal processing circuit 11 is configured to use electrical energy generated by power generator 6 moving in conjunction with operator 4 to output a signal. Input device 10 therefore uses electric power generated by power generator 6 along with operation (movement) of operator 4 to allow signal processing circuit 11 to operate. Input device 10 therefore does not require electric power to be separately supplied from an electrical cell, a battery, or a commercial power supply, for example.

When frictional force generated between movable member 3 and fixing member 2 is in here taken into account, movable member 3 moves when restoring force of spring member 7 overcomes a sum of frictional force described above and absorption force of one of permanent magnets 5, strictly speaking. The exemplary embodiment is described by assuming, however, that frictional force between movable member 3 and fixing member 2 is negligibly small.

(2) Details

Details of power generation device 1 according to the present exemplary embodiment, and input device 10 including power generation device 1 will be described below with reference to the accompanying drawings. Also in here, slide member 81 will be described later. Device main body 1A will first be described. It should be noted that the configurations described below are merely examples of the present disclosure, and the present disclosure is not limited to the following exemplary embodiment. Therefore, besides the following exemplary embodiment, various modifications are possible depending on design or the like without departing from the scope of the technical idea of the present disclosure.

In the present exemplary embodiment, operator 4 includes first button 401 and second button 402 away from each other in the predetermined directions. First button 401 and second button 402 can each be pressed in one of operation directions. The "operation directions" used in here correspond to directions intersecting the "predetermined directions" representing moving directions of movable member 3. Unless otherwise specified, the "predetermined directions" are described as the left-right directions, whereas the "operation directions" are described as up-down directions. Furthermore, one of the moving directions of movable member 3, in which movable member 3 moves from the first position (see FIG. 1B) to the second position (see FIG. 2B), is described as leftward, whereas a direction in which first button 401 and second button 402 are each pressed is described as downward. That is, up, down, left, and right directions are specified as illustrated by arrows indicated with "up", "down", "left", and "right" in FIG. 1B and other drawings. Directions orthogonal to a paper sheet of FIG. 1B are in here described as front-rear directions. A direction toward a side closer to you on the paper sheet is described as forward. That is, the front-rear directions are specified as illustrated by arrows indicated with "front" and "rear" in FIG. 1A and other drawings. However, it should be noted that the directions are not intended to specify the direction of use of device main body 1A. Further, the arrows that point the respective directions are illustrated only for explanation in the drawings. The arrows are unsubstantial.

In the present exemplary embodiment, the "predetermined directions" and the "operation directions" are described to be orthogonal to each other. The term "orthogonal" used in here includes not only a state where directions strictly intersect at an angle of 90 degrees, but also states where directions are substantially orthogonal to each other at an angle falling within a certain error range (the term "orthogonal" will be hereinafter identically or similarly used).

(2.1) Input Device

Figure 2B:
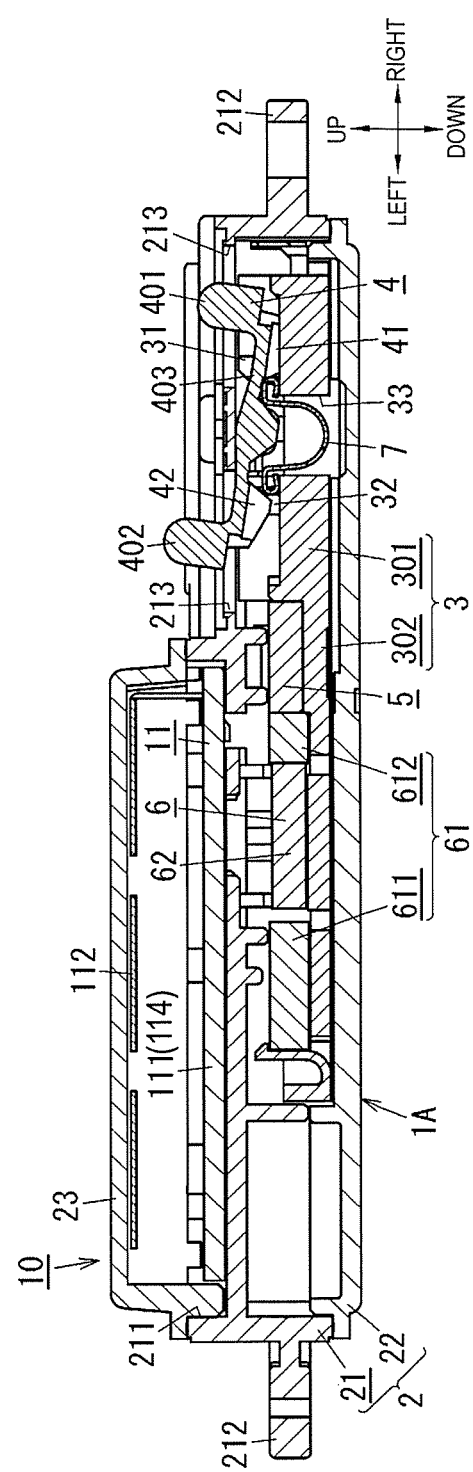
FIG. 2B is a cross-sectional view taken along line X1-X1 in FIG. 2A.

Input device 10 including device main body 1A will first be described with reference to FIGS. 1A to 4. FIG. 1B is a cross-sectional view taken along line X1-X1 in FIG. 1A. FIG. 2B is a cross-sectional view taken along line X1-X1 in FIG. 2A.

Input device 10 integrally includes power generation device 1 including device main body 1A (see FIG. 9A), and signal processing circuit 11. In the present exemplary embodiment, fixing member 2 of device main body 1A constitutes a housing having a rectangular parallelepiped shape elongated in the left-right directions. The housing accommodates components of device main body 1A. Input device 10 further includes upper cover 23 joined to fixing member 2.

Fixing member 2 is made of synthetic resin. Fixing member 2 includes first case 21 and second case 22. First case 21 is formed into a box shape having an opening on a lower surface. Second case 22 has a rectangular plate shape, and is joined to first case 21 to close the opening of first case 21. As described above, first case 21 and second case 22 being combined and joined to each other in the up-down directions constitute fixing member 2. A pair of attachment pieces 212 allowing fixing member 2 to be attached to an object respectively project from both end faces, in the left-right directions, of first case 21.

First case 21 and second case 22 are joined to each other through laser welding, for example. In input device 10, water, for example, can therefore be suppressed from entering a space surrounded by first case 21 and second case 22 from the joints of first case 21 and second case 22. Input device 10 including power generation device 1 (including device main body 1A) does not require an electrical cell or a battery, for example. That is, input device 10 does not require a space for accommodating an electrical cell or a battery. Furthermore, fixing member 2 does not require an openable lid allowing accessing to the space.

An upper surface of first case 21 is formed with a pair of through holes 213 arranged in the left-right directions. Each of the pair of through holes 213 is a hole that is open in an elliptical shape elongated in the front-rear directions, and that passes through first case 21 in the up-down directions. The pair of through holes 213 are holes allowing operator 4 of device main body 1A to be exposed from the upper surface of first case 21.

Operator 4 includes first button 401 and second button 402 away from each other in the left-right directions. Operator 4 moves as a seesaw. Strictly speaking, operator 4 includes first button 401 and second button 402 away from each other in the left-right directions when viewed from the upper surface. While operator 4 is movably held by fixing member 2, first button 401 projects from one, which is closer to the right side, of the pair of through holes 213, whereas second button 402 projects from another one, which is closer to the left side, of the pair of through holes 213. Operator 4 is held by fixing member 2 in a rotatable state between the first operation position (the position illustrated in FIGS. 1A and 1B) and the second operation position (the position illustrated in FIGS. 2A and 2B). In the present exemplary embodiment, operator 4 is made of synthetic resin. First button 401 and second button 402 are integrally formed.

While operator 4 is at the first operation position, operator 4 is inclined rightward and upward relative to the upper surface of first case 21 to allow first button 401 to relatively lie above second button 402. When first button 401 is pressed downward from this state, operator 4 rotates about rotation axis C1 (see FIG. 6) to move to the second operation position. At this time, first button 401 moves downward, whereas second button 402 moves upward. On the other hand, while operator 4 is at the second operation position, operator 4 is inclined leftward and upward relative to the upper surface of first case 21 to allow second button 402 to relatively lie above first button 401. When second button 402 is pressed downward from this state, operator 4 rotates about rotation axis C1 to move to the first operation position. At this time, second button 402 moves downward, whereas first button 401 moves upward. In short, operator 4 bi-directionally rotates about rotation axis C1 to seesaw between the first operation position and the second operation position.

The upper surface of first case 21 may be fixed with waterproof rubber having enough flexibility around the pair of through holes 213. The waterproof rubber is formed with holes allowing first button 401 and second button 402 to pass through. The waterproof rubber can fill gaps between circumferential edges of the pair of through holes 213 and first button 401 and second button 402. This can therefore suppress water, for example, from entering from the pair of through holes 213.

Signal processing circuit 11 is accommodated in accommodation recess 211 formed on the upper surface of first case 21. Accommodation recess 211 is formed to a left side of the pair of through holes 213 on the upper surface of first case 21. The upper surface of first case 21 is joined with upper cover 23 to close an opening face of accommodation recess 211. Signal processing circuit 11 is therefore accommodated between a bottom surface of accommodation recess 211 and upper cover 23. Upper cover 23 is made of synthetic resin. First case 21 and upper cover 23 are joined through laser welding, for example. This can therefore suppress, in input device 10, water, for example, from entering accommodation recess 211 from the joints of first case 21 and upper cover 23.

Signal processing circuit 11 includes printed circuit board 111, antenna 112, and various kinds of electronic components mounted on printed circuit board 111. The electronic components mounted on printed circuit board 111 constitute a power supply circuit, a control circuit, a memory, and a transmission circuit, for example. Antenna 112 is mounted on an upper surface of printed circuit board 111. A lower surface of printed circuit board 111 is provided with a coupling pad configured to electrically couple power generator 6 and ground wire 113 (see FIG. 4), described later. The bottom surface of accommodation recess 211 is formed with first connection hole 214 passing through first case 21 in the up-down directions at a position corresponding to coil 63 of power generator 6 (see FIG. 4), described later. Through first connection hole 214 (see FIG. 4), power generator 6 is electrically coupled to signal processing circuit 11. The bottom surface of accommodation recess 211 is further formed with second connection holes 215 passing through first case 21 in the up-down directions at positions corresponding to ground wire 113. Through second connection holes 215 (see FIG. 4), ground wire 113 is electrically coupled to signal processing circuit 11.

As a source of electric power, signal processing circuit 11 uses electric power generated by power generator 6 to operate. Signal processing circuit 11 further uses, as an electric signal, the electric power generated by power generator 6 to generate detection information in accordance with the electric signal. Signal processing circuit 11 uses radio waves as a transmission medium to transmit, through wireless communications, the generated detection information to a receiver via antenna 112. Signal processing circuit 11 follows a communication method, such as WiFi (registered trademark), Bluetooth (registered trademark), and specified small power radio. The specified small power radio refers to such small power radio that requires neither license nor registration. The specified small power radio uses, in Japan, for example, radio waves at frequencies conforming to a 420 MHz band or a 920 MHz band.

As will be described in detail in "(2.2) Power generation device", movable member 3 moves along with movement of operator 4 relative to fixing member 2 in device main body 1A. Power generator 6 then generates electric power. Power generator 6 outputs different electric signals (e.g., outputs electric signals that differ in polarity) between a case were movable member 3 moves from the first position to the second position and a case where movable member 3 moves from the second position to the first position. Based on an electric signal output from power generator 6, signal processing circuit 11 generates and transmits, to the receiver, detection information in accordance with a direction of movement of movable member 3.

In input device 10 according to the present exemplary embodiment, signal processing circuit 11 therefore receives electric power generated by power generator 6 when operator 4 is operated, and operates and transmits, to the receiver, detection information in accordance with the operation (movement) of operator 4. At this time, the detection information to be transmitted to the receiver changes depending on the direction of movement of movable member 3. That is, operator 4 serves as an operation part configured to cause power generator 6 to generate electric power, as well as serves as an operation part configured to cause signal processing circuit 11 to transmit the detection information. Therefore, a number of components is suppressed from increasing, compared with a configuration where an operation part configured to cause signal processing circuit 11 to transmit detection information is provided separately from operator 4 configured to cause device main body 1A to generate power.

Input device 10 is used, for example, as a crescent sensor configured to detect whether a crescent lock is locked or unlocked. In this case, input device 10 is attached to an object to be attached, i.e., a window frame, to allow operator 4 to be indirectly operated by a crescent lock. In input device 10, an operation state of operator 4 changes depending on whether a crescent lock is in a locked state or an unlocked state. The receiver configured to receive the detection information from input device 10 can therefore monitor whether the crescent lock is in the locked state or the unlocked state.

It is preferable that signal processing circuit 11 of input device 10 include capacitor 114. Input device 10 can therefore store in capacitor 114 electric charge generated by power generator 6, and can stably apply, to signal processing circuit 11, a voltage equal to or above a minimum operation voltage for signal processing circuit 11.

(2.2) Power Generation Device

Next, a configuration of device main body 1A in power generation device 1 will be described with reference to FIGS. 1A to 4.

Device main body 1A includes, as described above, fixing member 2 having the rectangular parallelepiped shape elongated in the left-right directions. The space surrounded by first case 21 and second case 22 constituting fixing member 2 accommodates the components of device main body 1A, including movable member 3, operator 4, permanent magnets 5, power generator 6, and spring member 7.

Movable member 3 is held by fixing member 2 in a state movable in a straight line in the left-right directions. Movable member 3 moves between the first position (the position illustrated in FIG. 1B) and the second position (the position illustrated in FIG. 2B). Since, in the present exemplary embodiment, the direction of movement of movable member 3 when movable member 3 moves from the first position to the second position is defined as leftward, the second position denotes a position shifted leftward from the first position, whereas the first position denotes a position shifted rightward from the second position. That is, the first position denotes a right end position within a movable range of movable member 3, whereas the second position denotes a left end position. A "first position side" in the left-right directions therefore denotes the "right side", whereas a "second position side" denotes the "left side".

Specifically, movable member 3 is accommodated in the space surrounded by first case 21 and second case 22. Movable member 3 includes first block 301 configured to hold spring member 7, and second block 302 configured to hold mover 61 of power generator 6, described later. First block 301 and second block 302 are arranged in the left-right directions. First block 301 is thus closer to the right side. In the present exemplary embodiment, movable member 3 is made of synthetic resin. First block 301 and second block 302 are integrally formed.

As movable member 3 is pinched between first case 21 and second case 22, movable member 3 is regulated from moving relative to fixing member 2. Furthermore, an upper surface of second case 22 is formed with a pair of guide grooves 221 extending in the left-right directions (see FIG. 4). A lower surface of movable member 3 is formed with projections respectively inserted into guide grooves 221. When the projections of movable member 3 are respectively inserted into the pair of guide grooves 221, movable member 3 is regulated from moving in the front-rear directions relative to fixing member 2. Therefore, movable member 3 is only movable in the left-right directions, relative to fixing member 2.

Figure 4:
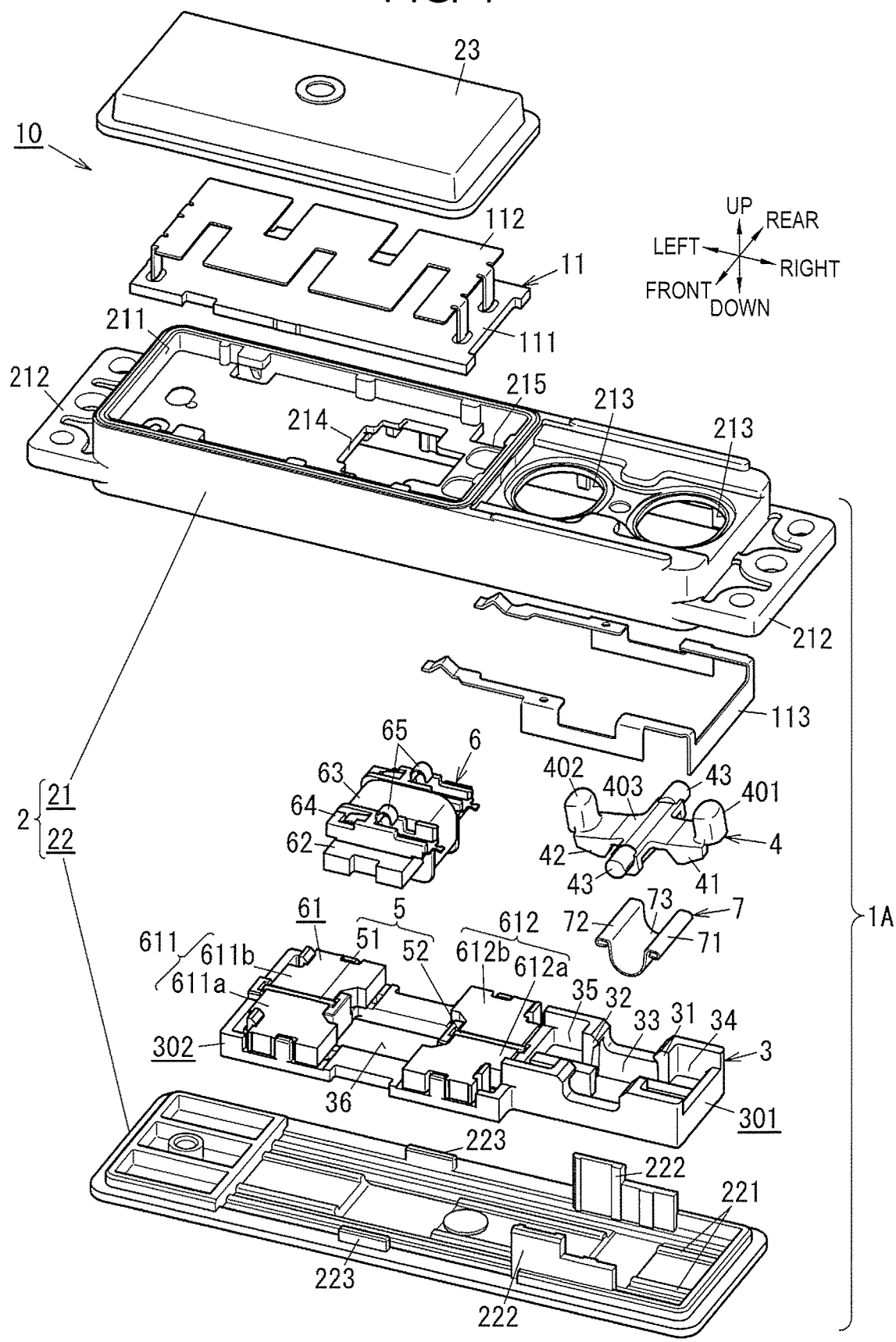
FIG. 4 is an exploded perspective view of the input device.

The upper surface of second case 22 is further formed with a pair of support walls 222 configured to support operator 4 (see FIG. 4). The pair of support walls 222 face each other in the front-rear directions, and are respectively disposed to both sides, in the front-rear directions, of first block 301. The upper surface of second case 22 is further formed with a pair of ribs 223 configured to support core 62 of power generator 6, described later (see FIG. 4). The pair of support walls 222 face each other in the front-rear directions, and are respectively disposed at positions to pinch first block 301. The pair of ribs 223 face each other in the front-rear directions, and are respectively disposed to both sides, in the front-rear directions, of second block 302.

As illustrated in FIG. 4, first block 301 includes first opening 33, and has a rectangular frame shape elongated in the left-right directions when viewed in a plane. First opening 33 accommodates spring member 7. An upper surface of first block 301 is formed with first recess 34 to a right side of first opening 33. The upper surface of first block 301 is further formed with second recess 35 to a left side of first opening 33. On first block 301, first holding part 31 is provided between first opening 33 and first recess 34. On first block 301, second holding part 32 is provided between first opening 33 and second recess 35. That is, movable member 3 includes first holding part 31 on a right side (the first position side) and second holding part 32 on a left side (second position side). First holding part 31 and second holding part 32 are away from each other in the left-right directions. First block 301 holds spring member 7 in first opening 33 to pinch spring member 7 between first holding part 31 and second holding part 32.

Second block 302 includes second opening 36, and has a rectangular frame shape elongated in the left-right directions when viewed in a plane. Second opening 36 accommodates coil 63 of power generator 6, described later. On an upper surface of second block 302, mover 61 of power generator 6 is fixed to both sides, in the left-right directions, of second opening 36, described later.

Spring member 7 is a member configured to transmit force from operator 4 to movable member 3, and is held by first block 301 of movable member 3, as described above. That is, when operator 4 moves, spring member 7 receives force from operator 4. Spring member 7 therefore deforms (is compressed) and stores elastic energy. Spring member 7 releases, toward movable member 3, energy (elastic energy) stored upon reception of force from operator 4, as described above, to transmit the force from operator 4 to movable member 3.

Spring member 7 is made of an elastic plate material, such as a metallic plate made of stainless steel (SUS). That is, in the present exemplary embodiment, spring member 7 is a plate spring. Spring member 7 includes, at both end parts in the left-right directions, respectively, first end part 71 and second end part 72. First end part 71 denotes a right end part of spring member 7. Second end part 72 denotes a left end part of spring member 7. Spring member 7 further includes, between first end part 71 and second end part 72, curved part 73 that is curved to project in a thickness direction (the up-down directions) of spring member 7. In here, curved part 73 has a shape curved to project downward when viewed in front view. It is preferable that curved part 73 be curved in an arc shape at a predetermined curvature. In the present exemplary embodiment, first end part 71 and second end part 72 are respectively further curled downward to curve and protrude in both the left-right directions when viewed in front view. Spring member 7 therefore has a substantially "Q" shape when viewed in front view.

As described in "(2.1) Input device", operator 4 is held by fixing member 2 in a rotatable state about rotation axis C1 (see FIG. 6) between the first operation position and the second operation position. When first button 401 is pressed, operator 4 rotates clockwise when viewed in front view. When second button 402 is pressed, operator 4 rotates counter-clockwise when viewed in front view. Operator 4 further includes lever main body 403 having a rectangular plate shape when viewed in a plane, and a pair of shafts 43 each formed into a circular column shape. First button 401 and second button 402 respectively project upward from both end parts, in the left-right directions, of an upper surface of lever main body 403. The pair of shafts 43 respectively project from both end faces, in the front-rear directions, of lever main body 403, each at a center, in the left-right directions, of lever main body 403. Operator 4 is pinched from above by first case 21 and held rotatably relative to fixing member 2 in a state where the pair of shafts 43 are respectively placed on the pair of support walls 222 of second case 22. The pair of shafts 43 are regulated from moving in the front-rear directions by a pair of bearing parts formed on an inner circumferential surface of first case 21.

In here, operator 4 further includes first pressing part 41 on a right side (the first position side) and second pressing part 42 on a left side (the second position side). First pressing part 41 and second pressing part 42 are away from each other in the left-right directions. First pressing part 41 and second pressing part 42 respectively project downward from both end parts, in the left-right directions, of a lower surface of lever main body 403. In the relationship between operator 4 and movable member 3, first pressing part 41 is disposed at a position corresponding to first recess 34 of first block 301, whereas second pressing part 42 is disposed at a position corresponding to second recess 35 of first block 301. In the relationship between operator 4 and spring member 7, first pressing part 41 and second pressing part 42 are respectively disposed to both sides, in the left-right directions, of spring member 7.

With the configuration described above, spring member 7 is pinched between first pressing part 41 and second holding part 32 when movable member 3 is at the first position. Spring member 7 is pinched between second pressing part 42 and first holding part 31 when movable member 3 is at the second position. When operator 4 moves from the first operation position to the second operation position, first pressing part 41 therefore approaches second holding part 32, whereas second pressing part 42 moves away from first holding part 31. At this time, spring member 7 is compressed by first pressing part 41 and second holding part 32. When operator 4 moves from the second operation position to the first operation position, second pressing part 42 approaches first holding part 31, whereas first pressing part 41 moves away from second holding part 32. At this time, spring member 7 is compressed by second pressing part 42 and first holding part 31.

When operator 4 moves, force from operator 4 is therefore transmitted to movable member 3 via spring member 7, causing movable member 3 to move. When operator 4 moves from the first operation position to the second operation position, movable member 3 moves from the first position to the second position. When operator 4 moves from the second operation position to the first operation position, movable member 3 moves from the second position to the first position. A detailed configuration of movable member 3 (in particular, first block 301), spring member 7, and operator 4 will be described in "(2.3) Quick moving mechanism".

Power generator 6 includes mover 61 configured to move in conjunction with movable member 3. Power generator 6 is configured to convert kinetic energy of mover 61 into electrical energy. Power generator 6 includes core 62 and coil 63 attached to core 62, in addition to mover 61 (see FIG. 4). In the present exemplary embodiment, power generator 6 further includes coil bobbin 64 and a pair of connection terminals 65 (see FIG. 4).

Coil bobbin 64 is made of synthetic resin. A conducting wire winded onto coil bobbin 64 constitutes coil 63. Core 62 is made of a magnetic material such as silicon steel sheet. In a state where coil bobbin 64 passes through coil 63 in the front-rear directions, core 62 is integrated with coil bobbin 64 and coil 63. The pair of connection terminals 65 are each made from a metallic plate having electric conductivity. The pair of connection terminals 65 are held by coil bobbin 64, and are respectively electrically coupled to both ends of the conducting wire constituting coil 63. The pair of connection terminals 65 are electrically coupled to signal processing circuit 11 via first connection hole 214 of first case 21.

Core 62 is fixed to fixing member 2. In here, core 62 is pressed from above by first case 21 and fixed to fixing member 2 in a state where both end parts in the front-rear directions are respectively placed on the pair of ribs 223 of second case 22. Core 62 is regulated from moving in the front-rear directions by a pair of regulation ribs formed on the inner circumferential surface of first case 21.

Mover 61 includes first movable piece 611 and second movable piece 612 respectively disposed to both sides, in the left-right directions, of core 62. In here, first movable piece 611 is divided into a pair of first yokes 611a, 611b in the front-rear directions. Second movable piece 612 is divided into a pair of second yokes 612a, 612b in the front-rear directions. The pair of first yokes 611a, 611b and the pair of second yokes 612a, 612b are each made of a magnetic material such as silicon steel sheet.

First movable piece 611 is fixed to a left side of second opening 36 on the upper surface of second block 302. Second movable piece 612 is fixed to a right side of second opening 36 on the upper surface of second block 302. First movable piece 611 and second movable piece 612 are respectively fixed to second block 302 with snap-fit structures including coupling parts projecting from the upper surface of second block 302, for example.

As described above, first movable piece 611 and second movable piece 612 are held by movable member 3. Mover 61 therefore moves in conjunction with movable member 3. As movable member 3 moves, mover 61 relatively moves relative to core 62 fixed to fixing member 2. In the relationship between movable member 3 and coil 63, coil 63 in here relatively moves in second opening 36 of movable member 3, avoiding movable member 3 and coil 63 from interfering with each other. As mover 61 moves, each of first movable piece 611 and second movable piece 612 approaches or moves away from corresponding one of both the end parts, in the front-rear directions, of core 62.

Specifically, while movable member 3 is at the first position, i.e., in the state illustrated in FIGS. 1A and 1B, first movable piece 611 is in contact with core 62. At this time, first yoke 611a is in contact with a front end part of core 62, whereas first yoke 611b is in contact with a rear end part of core 62. In this state, core 62 and second movable piece 612 are away from each other. On the other hand, while movable member 3 is at the second position, i.e., in the state illustrated in FIGS. 2A and 2B, second movable piece 612 is in contact with core 62. At this time, second yoke 612a is in contact with the front end part of core 62, whereas second yoke 612b is in contact with the rear end part of core 62. In this state, core 62 and first movable piece 611 are away from each other.

Permanent magnets 5 include first magnet 51 and second magnet 52. First magnet 51 is fixed to first movable piece 611. Second magnet 52 is fixed to second movable piece 612. First magnet 51 and second magnet 52 are each formed into a rectangular plate shape. First magnet 51 is pinched between the pair of first yokes 611a, 611b, and fixed to first movable piece 611. Similarly, second magnet 52 is pinched between the pair of second yokes 612a, 612b, and fixed to second movable piece 612. First magnet 51 is set with magnetic polarity where a front face serves as a north pole, whereas a rear face serves as a south pole. Therefore, first yoke 611a is magnetized to the north pole, whereas first yoke 611b is magnetized to the south pole. On the other hand, second magnet 52 is set with magnetic polarity where a front face serves as a south pole, whereas a rear face serves as a north pole. Therefore, second yoke 612a is magnetized to the south pole, whereas second yoke 612b is magnetized to the north pole.

In power generator 6 configured as described above, a direction of magnetic flux passing through core 62 changes along with movement of mover 61, causing coil 63 to generate electric power. That is, while movable member 3 is at the first position, first movable piece 611 is in contact with core 62, causing first yoke 611a, core 62, and first yoke 611b to form a magnetic path allowing magnetic flux generated by first magnet 51 to pass through. The direction of magnetic flux passing through core 62 therefore changes to rearward (a direction from the front end part to the rear end part). On the other hand, when movable member 3 moves from the first position to the second position, mover 61 moves in conjunction with movable member 3. While movable member 3 is at the second position, second movable piece 612 is in contact with core 62, causing second yoke 612b, core 62, and second yoke 612a to form a magnetic path allowing magnetic flux generated by second magnet 52 to pass through. The direction of magnetic flux passing through core 62 therefore changes to forward (a direction from the rear end part to the front end part). In short, power generator 6 generates electric power through electromagnetic induction where a magnetic field in coil 63 changes along with movement of movable member 3 to cause an induced current to flow into coil 63.

In the present exemplary embodiment, permanent magnets 5 have not only a function of changing the direction of magnetic flux passing through core 62, as described above, but also a function of generating absorption force for holding movable member 3 at each of the first position and the second position. That is, while movable member 3 is at the first position, first movable piece 611 is in contact with core 62. First movable piece 611 is absorbed to core 62 by magnetic flux generated by first magnet 51. Movable member 3 is thus held at the first position. On the other hand, while movable member 3 is at the second position, second movable piece 612 is in contact with core 62. Second movable piece 612 is absorbed to core 62 by magnetic flux generated by second magnet 52. Movable member 3 is thus held at the second position. As described above, permanent magnets 5 configured to cause power generator 6 to generate electric power are also used as permanent magnets configured to hold movable member 3 at each of the first position and the second position.

In the present exemplary embodiment, device main body 1A further includes ground wire 113. Ground wire 113 is made from a metallic plate having electric conductivity. Ground wire 113 is disposed around first block 301 along the inner circumferential surface of first case 21 to prevent interference from occurring with movable member 3 in the space between first case 21 and second case 22. Ground wire 113 is electrically coupled to a circuit ground (a reference potential point) of signal processing circuit 11 via second connection holes 215 of first case 21.

(2.3) Quick Moving Mechanism

Next, a detailed configuration of movable member 3 (in particular, first block 301), spring member 7, and operator 4 will be described with reference to FIGS. 5A to 6. FIG. 6 illustrates operator 4 with imaginary lines (alternate long and two short dashes lines). FIG. 6 further illustrates rotation axis C1 of operator 4 with an alternate long and short dash line. However, rotation axis C1 is merely described for purpose of illustration, and is unsubstantial.

Figure 5B:
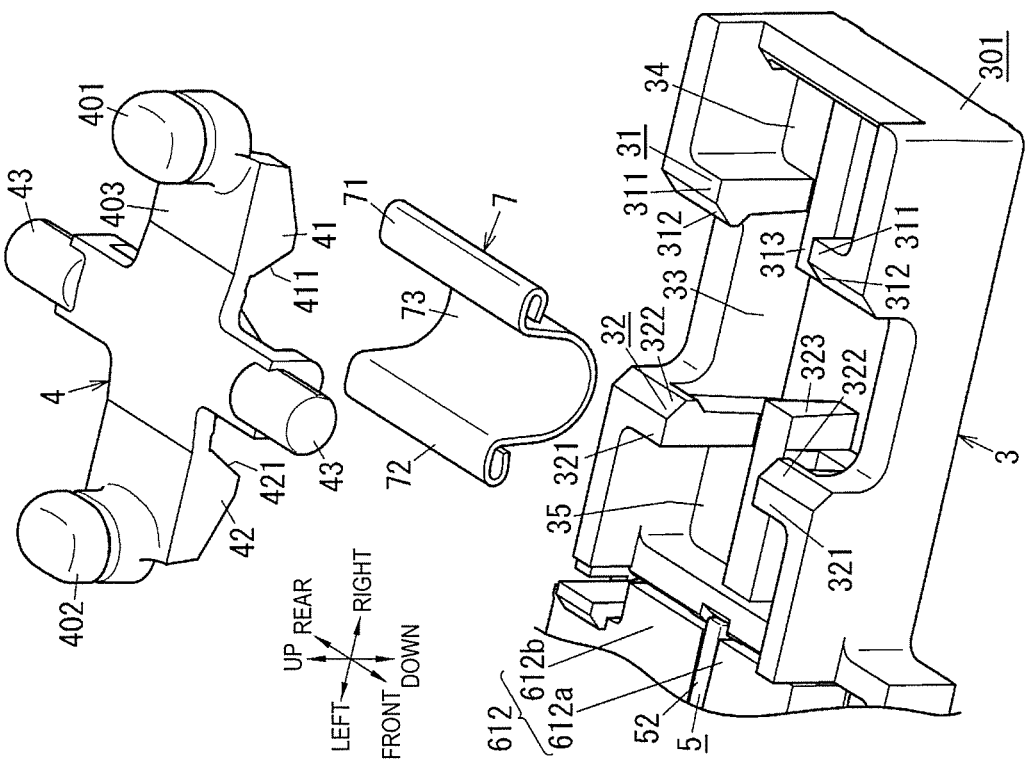
FIG. 5B is an exploded perspective view of main parts, illustrating a state where the operator is removed from the movable member in the power generation device.
Figure 6:
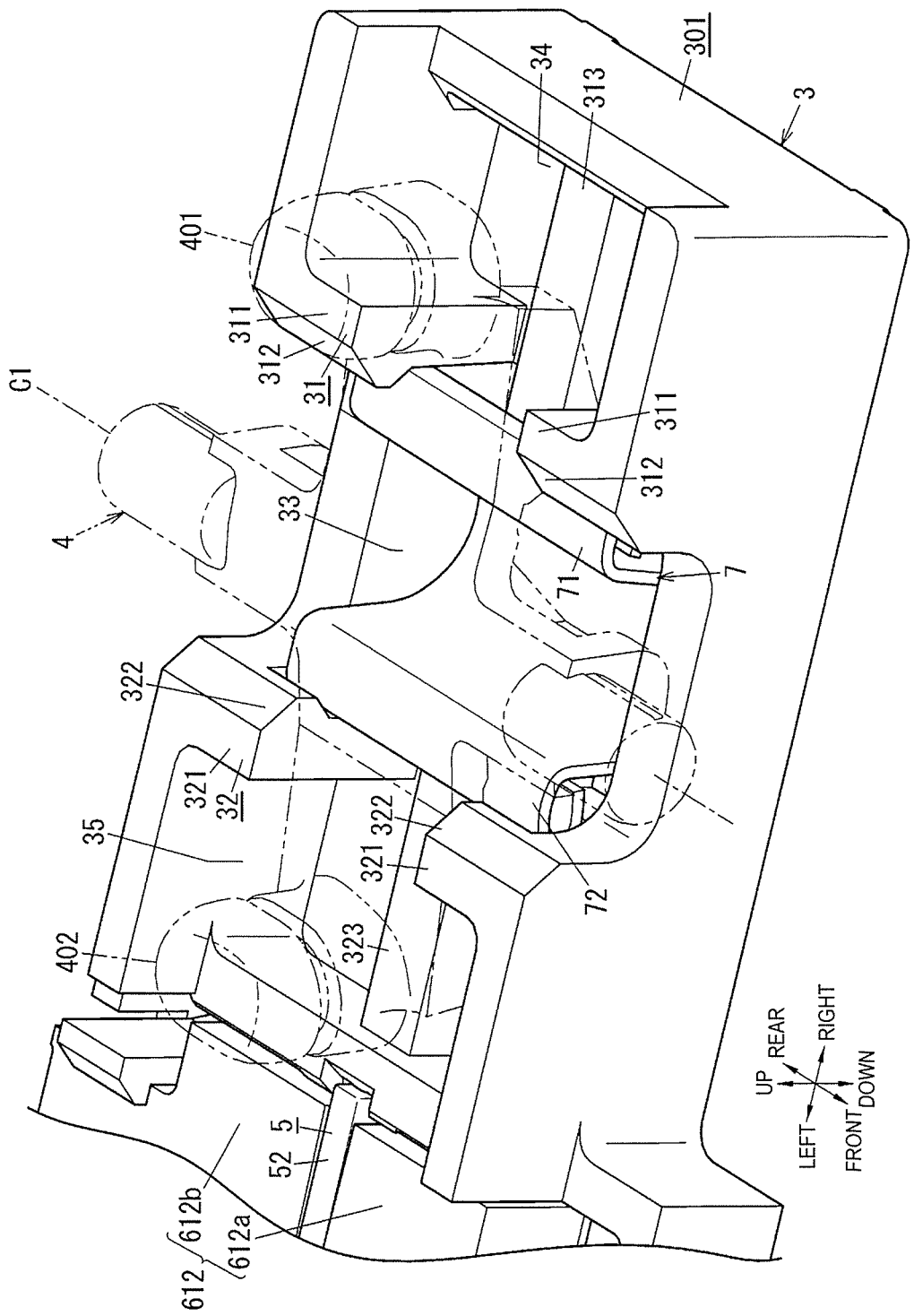
FIG. 6 is a perspective view of main parts, illustrating the movable member, the operator, and the spring member in the power generation device.

Movable member 3 holds spring member 7 between first holding part 31 and second holding part 32 arranged to face each other in the left-right directions with respect to first opening 33, as illustrated in FIGS. 5A and 5B. Movable member 3 (first block 301) is configured to be in contact with four corners of spring member 7 when viewed in a plane to hold spring member 7. Specifically, first holding part 31 includes a pair of first holding pieces 311 away from each other in a width direction orthogonal to the left-right directions. The pair of first holding pieces 311 are in contact with first end part 71 of spring member 7 from the right side. Similarly, second holding part 32 includes a pair of second holding pieces 321 away from each other in the width direction. The pair of second holding pieces 321 are in contact with second end part 72 of spring member 7 from the left side. The "width direction" used herein denotes a direction orthogonal to both of the predetermined directions (the left-right directions) and the operation directions (the up-down directions), and correspond to the front-rear directions, in the present exemplary embodiment.

First holding part 31 further includes a pair of first projections 312 respectively projecting leftward from left side surfaces, i.e., from upper end parts of surfaces facing second holding part 32, of the pair of first holding pieces 311. The pair of first projections 312 each have a substantially triangular shape when viewed in front view, and are in contact with first end part 71 of spring member 7 from above. Similarly, second holding part 32 includes a pair of second projections 322 respectively projecting rightward from right side surfaces, i.e., from upper end parts of surfaces facing first holding part 31, of the pair of second holding pieces 321. The pair of second projections 322 each have a substantially triangular shape when viewed in front view, and are in contact with second end part 72 of spring member 7 from above.

First holding part 31 further includes, between the pair of first holding pieces 311, first support 313 projecting upward from a bottom surface of first recess 34. First support 313 is away from the pair of first holding pieces 311 in the front-rear directions, and is in contact with first end part 71 of spring member 7 from below. Similarly, second holding part 32 includes, between the pair of second holding pieces 321, second support 323 projecting upward from a bottom surface of second recess 35. Second support 323 is away from the pair of second holding pieces 321 in the front-rear directions, and is in contact with second end part 72 of spring member 7 from below.

With the configuration described above, first holding part 31 is in contact with first end part 71 of spring member 7 from the right side, above, and below, regulating first end part 71 from moving rightward, upward, and downward. Second holding part 32 is in contact with second end part 72 of spring member 7 from the left side, above, and below, regulating second end part 72 from moving leftward, upward, and downward. In particular, the pair of first holding pieces 311 and the pair of second holding pieces 321 are in contact with the four corners of spring member 7 when viewed in a plane, regulating spring member 7 from moving in the left-right directions.

First end part 71 is pinched between the pair of first projections 312 and first support 313, whereas second end part 72 is pinched between the pair of second projections 322 and second support 323, holding, to movable member 3, and preventing spring member 7 from dropping. It is therefore preferable that amounts of engagement of spring member 7 (an amount of insertion of first end part 71 between the pair of first projections 312 and first support 313, and an amount of insertion of second end part 72 between the pair of second projections 322 and second support 323) each be set to range from approximately 0.5 mm to approximately 1.0 mm, for example.

A size in the front-rear directions of lever main body 403 of operator 4 is set to smaller, compared with a size between the pair of first holding pieces 311, and a size between the pair of second holding pieces 321. First pressing part 41 therefore lies between the pair of first holding pieces 311 in the front-rear directions. Second pressing part 42 lies between the pair of second holding pieces 321 in the front-rear directions.

With the positional relationship described above, as illustrated in FIG. 6, operator 4 can pass through between the pair of first holding pieces 311 to come into contact, at first pressing part 41, with first end part 71 of spring member 7 from the right side. Similarly, operator 4 can pass through between the pair of second holding pieces 321 to come into contact, at second pressing part 42, with second end part 72 of spring member 7 from the left side. That is, when first pressing part 41 comes into contact with a center, in the front-rear directions, of first end part 71 of spring member 7, or when second pressing part 42 comes into contact with a center, in the front-rear directions, of second end part 72 of spring member 7, operator 4 compresses spring member 7. In other words, operator 4 comes into contact with a center, in the front-rear directions, of spring member 7 to compress spring member 7. It is preferable that lower surfaces of first pressing part 41 and second pressing part 42 be each formed with a cut-away part configured to prevent interference from occurring with first support 313 and second support 323, respectively.

First pressing part 41 includes first inclined surface 411 inclined in the up-down directions at a position facing second holding part 32 in the left-right directions to change a distance to second holding part 32 in the left-right directions along with movement in the up-down directions. In other words, a left end face of first pressing part 41 serves as a contact surface configured to come into contact with first end part 71 of spring member 7, and constitutes first inclined surface 411 inclined and facing leftward and downward. Furthermore, second pressing part 42 includes second inclined surface 421 inclined in the up-down directions at a position facing first holding part 31 in the left-right directions to change a distance to first holding part 31 in the left-right directions along with movement in the up-down directions. In other words, a right end face of second pressing part 42 serves as a contact surface configured to come into contact with second end part 72 of spring member 7, and constitutes second inclined surface 421 inclined and facing rightward and downward. In here, first pressing part 41 and second pressing part 42 each have a substantially triangular shape when viewed in front view.

With the configuration described above, when operator 4 moves from the first operation position to the second operation position, first pressing part 41 moves downward, allowing first inclined surface 411 to narrow a gap between first pressing part 41 and second holding part 32 in the left-right directions. That is, as first pressing part 41 approaches second holding part 32, first inclined surface 411 converts downward force into leftward force, compressing spring member 7. On the other hand, when operator 4 moves from the first operation position to the second operation position, second pressing part 42 moves upward, allowing second inclined surface 421 to expand a gap between second pressing part 42 and first holding part 31 in the left-right directions. That is, second pressing part 42 moves away from first holding part 31. While spring member 7 is compressed, second pressing part 42 is away from second end part 72 of spring member 7, avoiding such an event that second pressing part 42 prevents second end part 72 of spring member 7 from moving when spring member 7 releases elastic energy.

When operator 4 moves from the second operation position to the first operation position, similarly, second pressing part 42 moves downward, allowing second inclined surface 421 to narrow the gap between second pressing part 42 and first holding part 31 in the left-right directions. That is, as second pressing part 42 approaches first holding part 31, second inclined surface 421 converts downward force into rightward force, compressing spring member 7. On the other hand, when operator 4 moves from the second operation position to the first operation position, first pressing part 41 moves upward, allowing first inclined surface 411 to expand the gap between first pressing part 41 and second holding part 32 in the left-right directions. While spring member 7 is compressed, first pressing part 41 is away from first end part 71 of spring member 7, avoiding such an event that first pressing part 41 prevents first end part 71 of spring member 7 from moving when spring member 7 releases elastic energy.

As described above, first inclined surface 411 and second inclined surface 421 each not only convert a direction of force applied to operator 4 to compress spring member 7, but also each function to provide, when spring member 7 releases elastic energy, a "safeguard" for avoiding spring member 7 and operator 4 from colliding with each other.

It is preferable that first holding part 31, second holding part 32, spring member 7, and operator 4 constituting the quick moving mechanism each have a shape that is plane symmetry. A reference surface that is plane symmetry is a plane including rotation axis C1 of operator 4, and expanding in directions orthogonal to the left-right directions.

(2.4) Operation

Operation of device main body 1A and input device 10 according to the present exemplary embodiment will be described below with reference to FIGS. 7A to 8C. As the description focuses on operation of movable member 3 (in particular, first block 301), spring member 7, and operator 4, FIGS. 7A to 8C illustrate views in which the cross-sectional view taken along line X1-X1 in FIG. 1A, which is illustrated in FIG. 1B, is only partially enlarged. FIGS. 7A to 8C illustrate directions of force with arrows (F1 to F4). However, the arrows are merely described for purpose of illustration, and are unsubstantial. FIGS. 7A to 8C illustrate rotation axis C1 of operator 4. However, rotation axis C1 is merely described for purpose of illustration, and is unsubstantial.

Operation of device main body 1A when operator 4 moves from the first operation position to the second operation position, and movable member 3 moves from the first position to the second position will first be described with reference to FIGS. 7A to 7C.

Figure 7A:
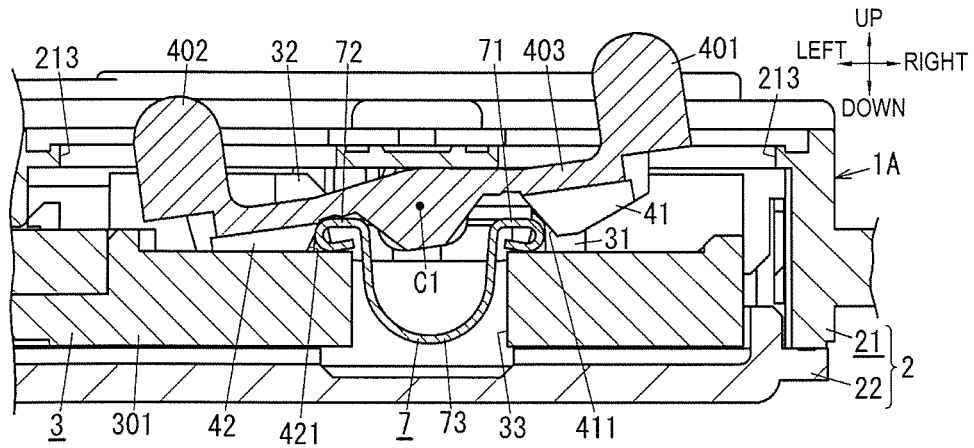
FIG. 7A is an operation description diagram when the movable member moves from the first position to the second position in the power generation device.

When operator 4 is not operated, i.e., no force is applied from outside of device main body 1A to operator 4, while movable member 3 is at the first position, as illustrated in FIG. 7A, operator 4 lies at the first operation position. In this state, spring member 7 is pinched between first pressing part 41 and second holding part 32 in the left-right directions. First pressing part 41 faces first end part 71 of spring member 7. Second holding part 32 faces second end part 72 of spring member 7. However, there may be a gap at least one of between first end part 71 and first pressing part 41 and between second end part 72 and second holding part 32.

Figure 7B:
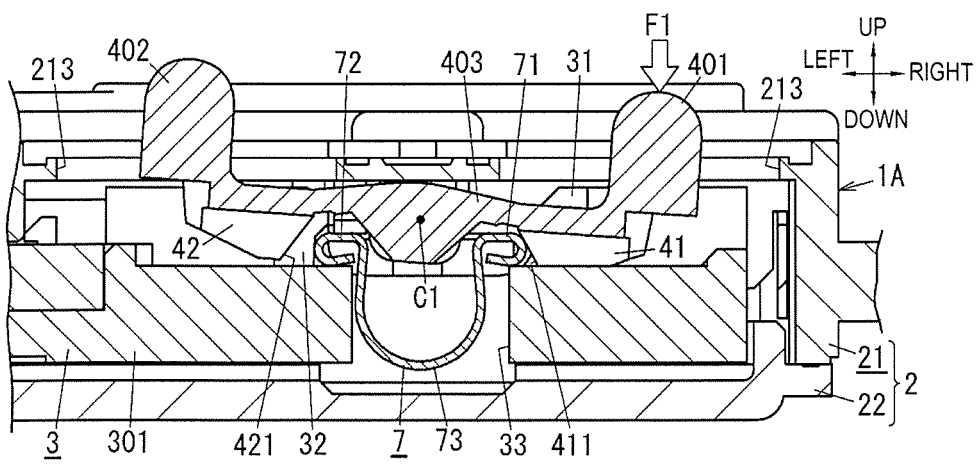
FIG. 7B is an operation description diagram when the movable member moves from the first position to the second position in the power generation device.

When downward force F1 acts onto first button 401 (when first button 401 is pressed) in this state, as illustrated in FIG. 7B, operator 4 rotates clockwise about rotation axis C1 when viewed in front view. That is, first pressing part 41 moves downward, allowing first inclined surface 411 to convert the downward force into leftward force to displace first end part 71 of spring member 7 leftward. Since, at this time, movable member 3 is held at the first position by absorption force generated by one of permanent magnets 5 (in here, first magnet 51), second holding part 32 does not move. Therefore, first pressing part 41 approaches second holding part 32 in the left-right directions. A gap between first end part 71 and second end part 72 of spring member 7 is narrowed. Curved part 73 deforms to reduce a radius of curvature. Therefore, spring member 7 is compressed. Elastic energy is accumulated in spring member 7. Spring member 7 generates restoring force.

Figure 7C:
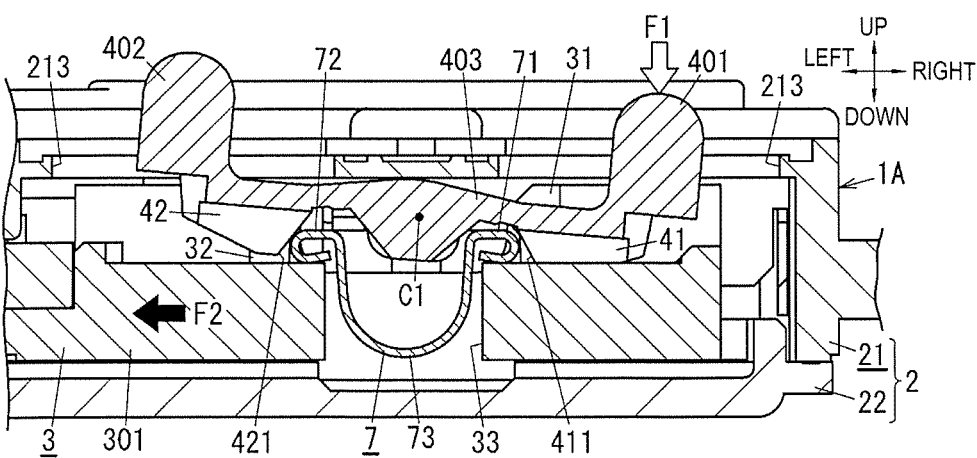
FIG. 7C is an operation description diagram when the movable member moves from the first position to the second position in the power generation device.

When downward force F1 continuously acts onto first button 401 in this state, as illustrated in FIG. 7C, operator 4 further rotates clockwise about rotation axis C1 when viewed in front view. At this time, first pressing part 41 further moves downward, allowing first inclined surface 411 to convert the downward force into leftward force to further displace first end part 71 of spring member 7 leftward. As the displacement of first end part 71 increases in amount, deformation of spring member 7 increases in amount, gradually increasing the elastic energy accumulated in spring member 7. When the restoring force of spring member 7 overcomes the absorption force of the one of permanent magnets 5 (in here, first magnet 51), movable member 3 held by the one of permanent magnets 5 is released, allowing spring member 7 to release the elastic energy. At this time, as second end part 72 of spring member 7 presses second holding part 32, restoring force F2 of spring member 7 causes movable member 3 to swiftly move leftward. As a result, movable member 3 comparatively quickly moves to a terminal position of the movable range, i.e., the second position (the position illustrated in FIG. 2B). When movable member 3 moves from the first position to the second position, kinetic energy of mover 61 held by movable member 3 is converted into electrical energy, causing power generator 6 to generate electric power.

Next, operation of device main body 1A when operator 4 moves from the second operation position to the first operation position, and movable member 3 moves from the second position to the first position will be described with reference to FIGS. 8A to 8C.

Figure 8A:
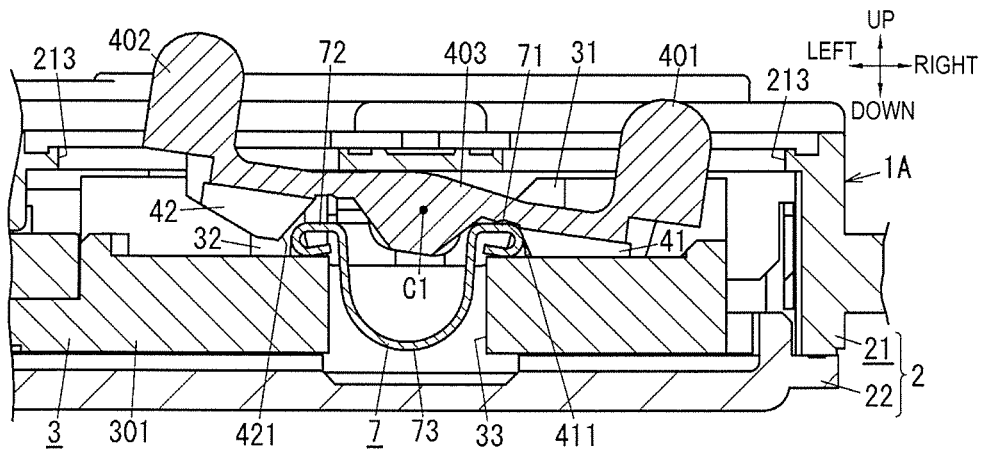
FIG. 8A is an operation description diagram when the movable member moves from the second position to the first position in the power generation device.

When operator 4 is not operated, i.e., no force is applied from outside of device main body 1A to operator 4, while movable member 3 is at the second position, as illustrated in FIG. 8A, operator 4 lies at the second operation position. In this state, spring member 7 is pinched between second pressing part 42 and first holding part 31 in the left-right directions. Second pressing part 42 faces second end part 72 of spring member 7. First holding part 31 faces first end part 71 of spring member 7. However, there may be a gap at least one of between second end part 72 and second pressing part 42 and between first end part 71 and first holding part 31.

Figure 8B:
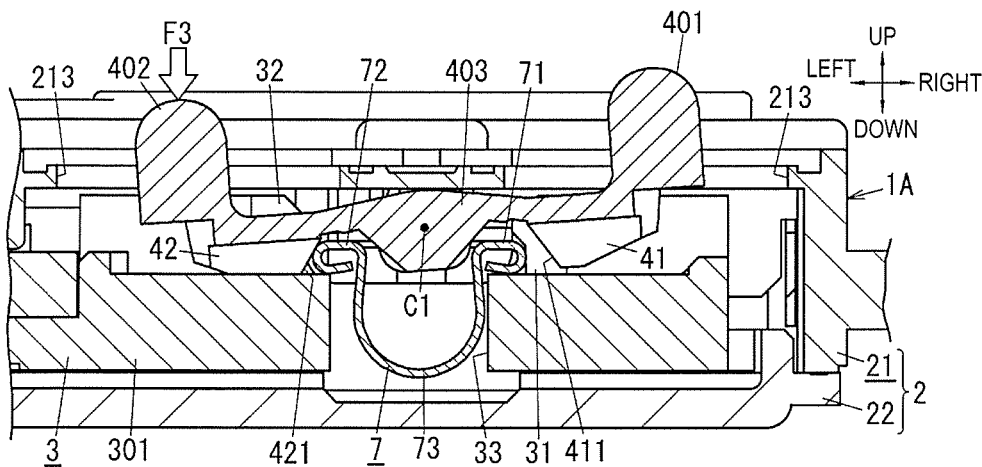
FIG. 8B is an operation description diagram when the movable member moves from the second position to the first position in the power generation device.

When downward force F3 acts onto second button 402 (when second button 402 is pressed) in this state, as illustrated in FIG. 8B, operator 4 rotates counter-clockwise about rotation axis C1 when viewed in front view. That is, second pressing part 42 moves downward, allowing second inclined surface 421 to convert the downward force into rightward force to displace second end part 72 of spring member 7 rightward. Since, at this time, movable member 3 is held at the second position by absorption force generated by one of permanent magnets 5 (in here, second magnet 52), first holding part 31 does not move. Therefore, second pressing part 42 approaches first holding part 31 in the left-right directions. The gap between first end part 71 and second end part 72 of spring member 7 is narrowed. Curved part 73 deforms to reduce the radius of curvature. Therefore, spring member 7 is compressed. Elastic energy is accumulated in spring member 7. Spring member 7 generates restoring force.

Figure 8C:
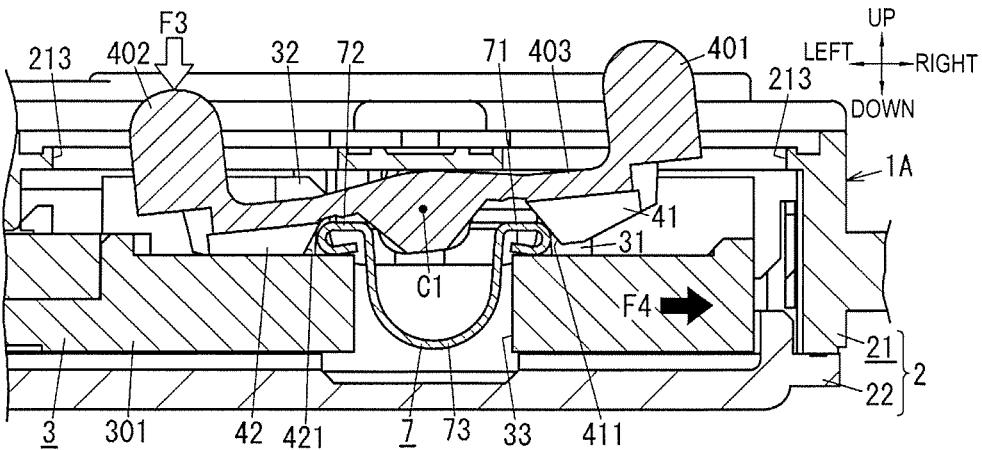
FIG. 8C is an operation description diagram when the movable member moves from the second position to the first position in the power generation device.

When downward force F3 continuously acts onto second button 402 in this state, as illustrated in FIG. 8C, operator 4 further rotates counter-clockwise about rotation axis C1 when viewed in front view. At this time, second pressing part 42 further moves downward, allowing second inclined surface 421 to convert the downward force into rightward force to further displace second end part 72 of spring member 7 rightward. As the displacement of second end part 72 increases in amount, deformation of spring member 7 increases in amount, gradually increasing the elastic energy accumulated in spring member 7. When the restoring force of spring member 7 overcomes the absorption force of the one of permanent magnets 5 (in here, second magnet 52), movable member 3 held by the one of permanent magnets 5 is released, allowing spring member 7 to release elastic energy. At this time, as first end part 71 of spring member 7 presses first holding part 31, restoring force F4 of spring member 7 causes movable member 3 to swiftly move rightward. As a result, movable member 3 comparatively quickly moves to a terminal position of the movable range, i.e., the first position (the position illustrated in FIG. 1B). When movable member 3 moves from the second position to the first position, kinetic energy of mover 61 held by movable member 3 is converted into electrical energy, causing power generator 6 to generate electric power.

How much the gap between first end part 71 and second end part 72 of spring member 7 should be narrowed to release movable member 3 held by one of permanent magnets 5 can be set as desired in accordance with spring modulus of spring member 7 and magnitude of absorption force of each of permanent magnets 5, for example. It is preferable that, as an example, such a value be set that, in a case where each of the amounts of engagement of spring member 7 ranges from approximately 0.5 mm to approximately 1.0 mm inclusive, as described above, restoring force of spring member 7 overcomes absorption force of each of permanent magnets 5 when the gap between first end part 71 and second end part 72 is narrowed by approximately 0.3 mm, for example.

In device main body 1A and input device 10 according to the present exemplary embodiment, as described above, movable member 3 moves from the first position to the second position, or movable member 3 moves from the second position to the first position, along with operation (movement) of operator 4. That is, movable member 3 linearly moves back and forth between the first position and the second position in the left-right directions. When movable member 3 moves from the first position to the second position, as well as when movable member 3 moves from the second position to the first position, restoring force of spring member 7 causes movable member 3 to comparatively quickly move. Therefore, when movable member 3 moves "forth" from the first position to the second position, as well as movable member 3 moves "back" from the second position to the first position, power generator 6 can similarly generate electric power.

(2.5) Overall Configuration of Power Generation Device

Next, an overall configuration of power generation device 1 and input device 10 according to the present exemplary embodiment will be described with reference to FIGS. 9A to 10B. FIG. 9B is a cross-sectional view taken along line X1-X1 in FIG. 9A. FIG. 10B is a cross-sectional view taken along line X1-X1 in FIG. 10A. In here, as illustrated in FIGS. 9A to 10B, and similar to the exemplary embodiment described above, directions are specified as illustrated by arrows indicated with "up", "down", "left", "right", "front", and "rear". However, it should be noted that the directions are not intended to specify the direction of use of input device 10.

Power generation device 1 according to the present exemplary embodiment includes device main body 1A and slide member 81, as described above. In the present exemplary embodiment, power generation device 1 further includes housing 82 accommodating slide member 81. Input device 10 includes power generation device 1 and signal processing circuit 11. In other words, input device 10 includes device main body 1A, slide member 81, housing 82, and signal processing circuit 11.

Housing 82 is formed into a box shape having an opening on its lower surface. Housing 82 is fixed to device main body 1A to cover an upper surface of device main body 1A, from above upper cover 23 of power generation device 1. A space formed between housing 82 and the upper surface of device main body 1A at least partially accommodates slide member 81 (pressing member 83). Housing 82 is formed with operation hole 821 passing through housing 82 in the up-down directions.

Housing 82 constitutes a component of fixing member 2. That is, fixing member 2 includes first case 21, second case 22, and housing 82. First case 21 and housing 82 are joined through laser welding, for example.

Slide member 81 is held by fixing member 2 in a state movable in a straight line in the left-right directions between the first slide position and the second slide position. When operator 4 is at the first operation position, slide member 81 lies at the first slide position. When operator 4 is at the second operation position, slide member 81 lies at the second slide position. However, slide member 81 moves separately from movable member 3 and operator 4. That is, movable member 3, operator 4, and slide member 81 are all movable relative to fixing member 2. Movable member 3, operator 4, and slide member 81 are independent, separate members from each other, and are movable separately. In here, the first slide position is, as illustrated in FIGS. 9A and 9B, a left end position in a movable range of slide member 81. The second slide position is, as illustrated in FIGS. 10A and 10B, a right end position in the movable range of slide member 81. In the present exemplary embodiment, slide member 81 is held by first case 21 and housing 82 included in fixing member 2.

Slide member 81 includes pressing member 83 and operation projection 84. Pressing member 83 is held by fixing member 2 in a state movable in a straight line in the left-right directions. Operation projection 84 projects upward from a part of an upper surface of pressing member 83. Operation projection 84 passes through operation hole 821 of housing 82 to project upward from an upper surface of housing 82. An upper end face (an upper surface) of operation projection 84 is formed with a plurality of grooves extending in the front-rear directions and arranged in the left-right directions, as an example.

Pressing member 83 is a member configured to press first button 401 and second button 402 of operator 4, and is disposed, on the upper surface of first case 21, at a position facing a portion formed with the pair of through holes 213 (see FIG. 3). In the present exemplary embodiment, when operation projection 84 is operated, and slide member 81 moves from the first slide position (see FIG. 9B) to the second slide position (see FIG. 10B), pressing member 83 moves rightward in a straight line. As pressing member 83 presses first button 401 at this time, operator 4 rotates and moves from the first operation position to the second operation position. First pressing part 41 is therefore displaced in the direction in which first pressing part 41 approaches second holding part 32. Restoring force of spring member 7 then causes movable member 3 to move from the first position to the second position (see FIGS. 7A to 7C). On the other hand, when operation projection 84 is operated, and slide member 81 moves from the second slide position (see FIG. 10B) to the first slide position (see FIG. 9B), pressing member 83 moves leftward in a straight line. As pressing member 83 presses second button 402 at this time, operator 4 rotates and moves from the second operation position to the first operation position. Second pressing part 42 is therefore displaced in the direction in which second pressing part 42 approaches first holding part 31. Restoring force of spring member 7 then causes movable member 3 to move from the second position to the first position (see FIGS. 8A to 8C).

As described above, power generation device 1 is configured to allow, when slide member 81 moves between the first slide position and the second slide position, slide member 81 to press operator 4, allowing operator 4 to move in conjunction with slide member 81.

More specifically, a right end face of pressing member 83 includes first tapered surface 832 inclined and facing rightward and downward. A left end face of pressing member 83 includes second tapered surface 831 inclined and facing leftward and downward. In other words, in pressing member 83, a lower surface of pressing member 83 serves as a contact surface configured to come into contact with operator 4 (first button 401 and second button 402), and has a flat region at a center in the left-right directions. First tapered surface 832 and second tapered surface 831 lie on both sides of the center. When pressing member 83 moves rightward in a straight line, first tapered surface 832 can therefore gradually press downward first button 401. When pressing member 83 moves leftward in a straight line, second tapered surface 831 can gradually press downward second button 402.

A pair of guide walls 216 configured to regulate pressing member 83 from moving in the front-rear directions are provided to both sides, in the front-rear directions, of the pair of through holes 213 (see FIG. 3) on the upper surface of first case 21. Housing 82 and first case 21 are provided with a regulation structure configured to pinch pressing member 83 from both sides in the up-down directions to regulate pressing member 83 from moving in the up-down directions. The pair of guide walls 216 and the regulation structure regulate moving directions of pressing member 83. Pressing member 83 is thus movable in only the left-right directions.

In power generation device 1 and input device 10 according to the present exemplary embodiment, as described above, when slide member 81 moves between the first slide position and the second slide position, slide member 81 presses operator 4, allowing operator 4 to move in conjunction with slide member 81. With this configuration, slide member 81 indirectly operates operator 4. Depending on a position of slide member 81 (the first slide position or the second slide position), an operation state of operator 4 thus changes. As a result, each time slide member 81 is operated, input device 10 can use electrical energy generated by power generator 6 moving in conjunction with operator 4 to transmit detection information in accordance with a position of slide member 81 from signal processing circuit 11 to the receiver, for example.

In the present exemplary embodiment, when slide member 81 moves from the first slide position to the second slide position, operator 4 moves in the direction in which first pressing part 41 approaches second holding part 32. However, the present disclosure is not limited to this example. That is, such a configuration may be applied that, when slide member 81 moves from the second slide position to the first slide position, operator 4 moves in the direction in which first pressing part 41 approaches second holding part 32.

(3) Effects

In power generation device 1 according to the present exemplary embodiment, as described above, restoring force of single spring member 7 is used to allow movable member 3 to move from the first position to the second position, and to allow movable member 3 to move from the second position to the first position. That is, when movable member 3 moves from the first position to the second position, as well as when movable member 3 moves from the second position to the first position, restoring force of spring member 7 is used to allow movable member 3 to comparatively quickly move, achieving a stable amount of power generation in power generator 6. Therefore, in a case where movable member 3 is allowed to move bi-directionally between the first position and the second position, a comparatively stable amount of power generation can be achieved. As well as, since spring member 7 can be achieved as a single member, a number of components serving as spring member 7 can be suppressed to be smaller. Therefore, power generation device 1 can be simplified in structure. As well as, power generation device 1 can be small-sized.

Furthermore, since restoring force of single spring member 7 is used to allow movable member 3 to move from the first position to the second position, as well as to allow movable member 3 to move from the second position to the first position, an amount of power generation in power generator 6 is suppressed from varying when movable member 3 is allowed to move bi-directionally. That is, movement of movable member 3 from the first position to the second position and movement of movable member 3 from the second position to the first position are substantially symmetric in operation. Therefore, a movement speed and a stroke of movable member 3 becomes substantially even between movement of movable member 3 from the first position to the second position and movement of movable member 3 from the second position to the first position, suppressing an amount of power generation in power generator 6 from varying.

It is preferable that, as described in the present exemplary embodiment, spring member 7 be a plate spring including first end part 71 and second end part 72 respectively at both the end parts in the predetermined directions (the left-right directions). In this case, it is preferable that spring member 7 further include, between first end part 71 and second end part 72, curved part 73 that is curved to project in the thickness direction of spring member 7. With this configuration, a plate spring having a shape symmetric in the predetermined directions, i.e., the moving directions of movable member 3, can be adopted as spring member 7. Therefore, restoring force of spring member 7 can be suppressed from varying between movement of movable member 3 from the first position to the second position and movement of movable member 3 from the second position to the first position. This configuration is not an essential configuration for power generation device 1. For example, spring member 7 may include, instead of curved part 73, a bent part that is bent at a predetermined angle.

It is preferable that, as described in the present exemplary embodiment, first holding part 31 include the pair of first holding pieces 311 away from each other in the width direction (the front-rear directions) orthogonal to the predetermined directions (the left-right directions), and be configured to allow the pair of first holding pieces 311 to come into contact with spring member 7. In this case, it is preferable that second holding part 32 include the pair of second holding pieces 321 away from each other in the width direction, and be configured to allow the pair of second holding pieces 321 to come into contact with spring member 7. In this case, it is preferable that first pressing part 41 lie between the pair of first holding pieces 311 in the width direction, whereas second pressing part 42 lie between the pair of second holding pieces 321 in the width direction. With this configuration, operator 4 can pass through between the pair of first holding pieces 311 to allow first pressing part 41 to press spring member 7. Similarly, operator 4 can pass through between the pair of second holding pieces 321 to allow second pressing part 42 to press spring member 7. Therefore, when first pressing part 41 or second pressing part 42 compresses spring member 7, spring member 7 would be less likely to incline in the width direction, allowing spring member 7 to be pressed in a straight line in the predetermined directions. As a result, spring member 7 can easily and stably generate restoring force. However, this configuration is not an essential configuration for power generation device 1. For example, first pressing part 41 or second pressing part 42 may be configured to press an end part, in the width direction, of spring member 7.

It is preferable that, as described in the present exemplary embodiment, movable member 3 be held by fixing member 2 in a state movable in a straight line in the predetermined directions (the left-right directions). With this configuration, since movable member 3 moves in a straight line, power generation device 1 can be suppressed in size as much as possible from expanding in another direction than the predetermined directions. For example, as described in the present exemplary embodiment, when input device 10 is used as a crescent sensor, power generation device 1 having an elongated shape with a size falling within a width of an object to be attached, i.e., a window frame, can be achieved. However, this configuration is not an essential configuration for power generation device 1. Movable member 3 may be configured to rotate and move, as can be seen in a seesaw structure, for example.

It is preferable that, as described in the present exemplary embodiment, operator 4 be held by fixing member 2 in a rotatable state between the first operation position and the second operation position. In this case, it is preferable that operator 4 be configured to allow, when moving from the first operation position to the second operation position, first pressing part 41 to approach second holding part 32, and second pressing part 42 to move away from first holding part 31. In this case, it is preferable that operator 4 be configured to allow, when moving from the second operation position to the first operation position, second pressing part 42 to approach first holding part 31, and first pressing part 41 to move away from second holding part 32. With this configuration, since operator 4 seesaws between the first operation position and the second operation position, second pressing part 42 moves upward when first pressing part 41 moves downward, for example. Therefore, either of first pressing part 41 and second pressing part 42, whichever does not press spring member 7, can be evacuated from an advancement path of movable member 3, avoiding such an event from occurring that first pressing part 41 or second pressing part 42 inhibits movable member 3 from moving. As a result, an amount of power generation in power generator 6 is suppressed from lowering due to when movable member 3 is inhibited from moving. However, this configuration is not an essential configuration for power generation device 1. Operator 4 may not have a seesaw structure.

In this case, it is preferable, as described in the present exemplary embodiment, that operator 4 be configured to be movable relative to fixing member 2 to allow first pressing part 41 and second pressing part 42 to move in the operation directions (the up-down directions) intersecting the predetermined directions (the left-right directions). In this case, it is preferable that first pressing part 41 include first inclined surface 411 inclined relative to the operation directions at a position facing second holding part 32 in the predetermined directions to change the distance to second holding part 32 in the predetermined directions along with movement in the operation directions. It is preferable that second pressing part 42 include second inclined surface 421 inclined relative to the operation directions at a position facing first holding part 31 in the predetermined directions to change the distance to first holding part 31 in the predetermined directions along with movement in the operation directions. With this configuration, first inclined surface 411 and second inclined surface 421 each not only convert a direction of force applied to operator 4 to compress spring member 7, but also each function to provide, when spring member 7 releases elastic energy, a "safeguard" for avoiding spring member 7 and operator 4 from colliding with each other. Therefore, an amount of power generation in power generator 6 is further suppressed from lowering due to when movable member 3 is inhibited from moving. However, this configuration is not an essential configuration for power generation device 1. First pressing part 41 and second pressing part 42 may each include no inclined surface. For example, contact surfaces of spring member 7, which respectively come into contact with first pressing part 41 and second pressing part 42, may be inclined surfaces.

It is preferable that, as described in the present exemplary embodiment, power generator 6 further include core 62 and coil 63 attached to core 62. In this case, it is preferable that power generator 6 be configured, as the direction of magnetic flux passing through core 62 changes along with movement of mover 61, to cause coil 63 to generate electric power. With this configuration, permanent magnets 5 configured to generate absorption force for holding movable member 3 at each of the first position and the second position can be shared by power generator 6 for generating electric power. However, this configuration is not an essential configuration for power generation device 1. Power generator 6 does not necessarily use electromagnetic induction, but may be configured to use a piezoelectric element or a magnetostrictor, for example, to convert kinetic energy into electrical energy. Furthermore, separately from permanent magnets 5 configured to generate absorption force, a permanent magnet configured to generate electric power may be provided in power generator 6.

In this case, it is preferable, as described in the present exemplary embodiment, that mover 61 include first movable piece 611 and second movable piece 612 to both the sides, in the predetermined directions (the left-right directions), of core 62. First movable piece 611 is configured to be in contact with core 62 while movable member 3 is at the first position. Second movable piece 612 is configured to be in contact with core 62 while movable member 3 is at the second position. In this case, it is preferable that permanent magnets 5 include first magnet 51 fixed to first movable piece 611 and second magnet 52 fixed to second movable piece 612. With this configuration, a comparatively simple configuration where core 62 relatively moves between first movable piece 611 and second movable piece 612 can cause the direction of magnetic flux passing through core 62 to change to generate electric power. However, this configuration is not an essential configuration for power generation device 1. Power generator 6 may be configured to use single permanent magnet 5 to change the direction of magnetic flux passing through core 62, for example.

It is preferable, as described in the present exemplary embodiment, that input device 10 include power generation device 1 and signal processing circuit 11 electrically coupled to power generator 6 to use electrical energy generated by power generator 6 moving in conjunction with operator 4 to output a signal. With this configuration, input device 10 can be simplified in structure. As well as input device 10 can be small-sized. Furthermore, an electrical cell or a battery, for example, configured to drive signal processing circuit 11 can be reduced in capacity in input device 10. Otherwise, such an electrical cell or a battery can be omitted.

(4) Modification Examples

Hereinafter, some modification examples to the exemplary embodiment will be described.

As long as operator 4 includes first pressing part 41 and second pressing part 42 away from each other in the predetermined directions, first pressing part 41 and second pressing part 42 may not be integrated, but may be separated from each other. That is, first pressing part 41 and second pressing part 42 may be integrated into a single member. Otherwise, first pressing part 41 and second pressing part 42 may be members separated from each other, and may be separately movable.

Input device 10 may not be configured to detect a position of a machine component (crescent lock), such as a crescent sensor described above, but may be configured to be operated by a person as a switch for operating a device, for example. In this case, power generation device 1 may be configured to allow operator 4 to be directly operated by a person. Otherwise, power generation device 1 may be configured to allow operator 4 to be indirectly operated by a person via an operation handle, for example.

Input device 10 may be provided, separately from power generator 6, with a switch configured to transmit detection information to signal processing circuit 11. In this case, signal processing circuit 11 operates with electric power generated by power generator 6 to generate a detection signal in accordance with whether the switch comes on or goes off. In this case, the switch may come on or go off in conjunction with operator 4. Otherwise, an operation part configured to operate the switch may be provided, separately from operator 4 of power generation device 1.

A communication method between signal processing circuit 11 and the receiver is not necessarily wireless communications via radio waves serving as a transmission medium, but may be, for example, optical wireless communications via infrared light used as a medium, or wired communications.

Power generation device 1 may at least use single restoring force generated by spring member 7 for moving movable member 3 from the first position to the second position and for moving movable member 3 from the second position to the first position. The configuration where spring member 7 is a single member is not an essential configuration for power generation device 1. For example, a plurality of spring members 7 may be provided in series or in parallel between operator 4 and movable member 3. Even in this case, single restoring force of the plurality of spring members 7 is used to allow movable member 3 to move from the first position to the second position and to move movable member 3 from the second position to the first position.

Spring member 7 does not necessarily have the configuration illustrated in the exemplary embodiment described above. Spring member 7 may not be curled at first end part 71 and second end part 72, for example. Furthermore, spring member 7 is not necessarily a plate spring. Spring member 7 may be a compression coil spring or a torsion spring, for example.

In power generator 6, core 62 and coil 63 may be provided to mover 61, as well as permanent magnets 5 may be provided to a stator (i.e., a member fixed to fixing member 2). Even with this configuration, permanent magnets 5 can relatively move relative to core 62, changing the direction of magnetic flux passing through core 62 as mover 61 moves.

Operator 4 is not necessarily exposed from an upper surface of fixing member 2. Operator 4 may be exposed from a side surface or a lower surface of fixing member 2. In a case where operator 4 is provided on the side surface of fixing member 2, operator 4 may move in a straight line in the predetermined directions between the first operation position and the second operation position. That is, operator 4 does not necessarily have a seesaw structure, but may have a direct-driven type push button structure or a slide structure, for example.

As long as mover 61 of power generator 6 moves in conjunction with movable member 3, mover 61 is not necessarily fixed to movable member 3. For example, mover 61 may be a part of movable member 3. Otherwise, mover 61 may be coupled to movable member 3 via a link.

Power generation device 1 may be configured to cause power generator 6 to generate electric power only in either of movement of movable member 3 from the first position to the second position and movement of movable member 3 from the second position to the first position.

Operator 4 does not necessarily include two buttons (first button 401 and second button 402), as described above in the exemplary embodiment. Operator 4 may include three or more buttons. Otherwise, operator 4 may include only one button.

Power generation device 1 is not necessarily used in input device 10. Power generation device 1 may be solely used, or incorporated for use in other apparatuses and facilities, for example, than input device 10.

In input device 10, as described above in the exemplary embodiment, upper cover 23 does not necessarily accommodate signal processing circuit 11. Signal processing circuit 11 may be partially or wholly provided outside of upper cover 23. Signal processing circuit 11 does not necessarily include a power supply circuit, a control circuit, a memory, and a communication circuit, for example. Signal processing circuit 11 may include electronic components constituting a sensor, an analog-to-digital (AD) converter, a digital-to-analog (DA) converter, and a receiving circuit, for example.

REFERENCE MARKS IN THE DRAWINGS

1: power generation device
1A: device main body
2: fixing member
3: movable member
4: operator
5: permanent magnet
6: power generator
7: spring member
10: input device
11: signal processing circuit
21, 22: case
23: upper cover
31: first holding part
32: second holding part
33: first opening
34: first recess
35: second recess
36: second opening
41: first pressing part
42: second pressing part
43: shaft
51: magnet
52: magnet
61: mover
62: core
63: coil
64: coil bobbin
65: connection terminal
71: end part
72: end part
73: curve
81: slide member
82: housing
83: pressing member
84: operation projection
111: printed circuit board
112: antenna
113: ground wire
114: capacitor
211: accommodation recess
212: attachment piece
213: through hole
214: connection hole
215: connection hole
216: guide wall
221: guide groove
222: support wall
223: rib
301: first block
302: second block
311: holding piece
312: projection
313: support
321: holding piece
322: projection
323: support
401: button
402: button
403: lever main body
411: inclined surface
421: inclined surface
611: movable piece
611a, 611b, 612a, 612b: yoke
612: movable piece
821: operation hole
831, 832: tapered surface
C1: rotation axis
F1: force
F2: restoring force
F3: force
F4: restoring force

The invention claimed is:

1. A power generation device comprising:
a fixing member;
a movable member held by the fixing member, the movable member being movable, relative to the fixing member, in a first direction between a first position and a second position;
an operator configured to move between a first operation position and a second operation position, the operator lying at the first operation position while the movable member is at the first position, the operator lying at the second operation position while the movable member is at the second position;
magnets configured to generate absorption force for holding the movable member at each of the first position and the second position;
a power generator including a mover configured to move in conjunction with the movable member, the power generator being configured to convert kinetic energy of the mover into electrical energy;
a spring member held by the movable member, the spring member being configured to transmit force from the operator to the movable member; and
a slide member held by the fixing member,
wherein the movable member includes a first holding part and a second holding part away from each other in the first direction,
the movable member holds the spring member between the first holding part and the second holding part,
the operator includes a first pressing part and a second pressing part,
while the operator is at the first operation position, the first pressing part and the second holding part pinch the spring member,
while the operator is at the second operation position, the second pressing part and the first holding part pinch the spring member,
when the operator moves in a direction in which the first pressing part approaches the second holding part while the movable member is at the first position, the first pressing part and the second holding part compress the spring member to allow the spring member to generate restoring force for moving the movable member from the first position to the second position, when the operator moves in a direction in which the second pressing part approaches the first holding part while the movable member is at the second position, the second pressing part and the first holding part compress the spring member to allow the spring member to generate restoring force for moving the movable member from the second position to the first position, the slide member is movable in the first direction between a first slide position and a second slide position, the slide member lying at the first slide position while the operator is at the first operation position, the slide member lying at the second slide position while the operator is at the second operation position, when the slide member moves between the first slide position and the second slide position, the slide member presses the operator, and the operator is configured to move in conjunction with the slide member.

2. The power generation device according to claim 1, wherein the spring member is a plate spring made from a metallic plate, the plate spring having an arc-shaped curve.

3. An input device comprising:
the power generation device according to claim 1; and
a signal processing circuit electrically coupled to the power generator, the signal processing circuit being configured to use the electrical energy generated by the power generator moving in conjunction with the operator to output a signal.

4. The input device according to claim 3, wherein
the signal processing circuit includes a capacitor, and
the capacitor is capable of storing electric charge generated by the power generator.

5. An input device comprising:
the power generation device according to claim 2; and
a signal processing circuit electrically coupled to the power generator, the signal processing circuit being configured to use the electrical energy generated by the power generator moving in conjunction with the operator to output a signal.

6. The input device according to claim 5, wherein
the signal processing circuit includes a capacitor, and
the capacitor is capable of storing electric charge generated by the power generator.

* * * * *